(12) United States Patent
Kamei et al.

(10) Patent No.: US 11,439,949 B2
(45) Date of Patent: Sep. 13, 2022

(54) AIR COMPOSITION ADJUSTING DEVICE

(71) Applicant: DAIKIN INDUSTRIES, LTD., Osaka (JP)

(72) Inventors: Noritaka Kamei, Osaka (JP); Naohiro Tanaka, Osaka (JP); Hidenori Matsui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 210 days.

(21) Appl. No.: 16/651,578

(22) PCT Filed: Sep. 27, 2018

(86) PCT No.: PCT/JP2018/036050
§ 371 (c)(1),
(2) Date: Mar. 27, 2020

(87) PCT Pub. No.: WO2019/065885
PCT Pub. Date: Apr. 4, 2019

(65) Prior Publication Data
US 2020/0254384 A1    Aug. 13, 2020

(30) Foreign Application Priority Data

Sep. 29, 2017  (JP) .............................. JP2017-190145
Mar. 2, 2018   (JP) .............................. JP2018-037288

(51) Int. Cl.
*F24F 7/06*    (2006.01)
*B01D 53/22*   (2006.01)
*B01D 53/04*   (2006.01)

(52) U.S. Cl.
CPC ....... *B01D 53/229* (2013.01); *B01D 53/0446* (2013.01); *B01D 53/0454* (2013.01);
(Continued)

(58) Field of Classification Search
CPC ... A23B 7/148; A23L 3/34095; A23L 3/3418; F24F 7/06; Y02C 20/40; B01D 53/0446;
(Continued)

(56) References Cited

U.S. PATENT DOCUMENTS 4,829,774 A   5/1989   Wassibauer et al.
5,167,243 A   12/1992  Cowan et al.
(Continued)

FOREIGN PATENT DOCUMENTS

CN    86 1 07678 A    7/1987
CN    101331071 A     12/2008
(Continued)

OTHER PUBLICATIONS

International Preliminary Report on Patentability and the Written Opinion of the International Searching Authority (Forms PCT/IB/373 and PCT/ISA/237) for International Application No. PCT/JP2018/036048, dated Mar. 31, 2020.
(Continued)

*Primary Examiner* — Frank M Lawrence, Jr.
(74) *Attorney, Agent, or Firm* — Birch, Stewart, Kolasch & Birch, LLP

(57) ABSTRACT

An air composition adjusting device includes: an oxygen separator that separates oxygen from external air to be supplied to a target space; a gas supply path including a high concentration gas supply path for oxygen through which the oxygen separator communicates with the target space; and a controller that performs an oxygen concentration raising operation of supplying a high oxygen concentration gas, which has a higher oxygen concentration than external air before being treated by the oxygen separator, to the target space through the high concentration gas supply path for oxygen.

14 Claims, 13 Drawing Sheets

(52) U.S. Cl.
CPC ............ *F24F 7/06* (2013.01); *B01D 2256/12* (2013.01); *B01D 2256/22* (2013.01); *B01D 2257/104* (2013.01); *B01D 2257/504* (2013.01); *B01D 2259/4525* (2013.01)

(58) Field of Classification Search
CPC .. B01D 53/0454; B01D 53/229; B01D 53/22; B01D 2256/12; B01D 2256/22; B01D 2257/104; B01D 2257/504; B01D 2259/4525
USPC ..... 96/4–14, 108, 111, 121; 95/8, 11, 43, 54
See application file for complete search history.

(56) References Cited

U.S. PATENT DOCUMENTS

| | | | |
|---|---|---|---|
| 6,460,352 B1* | 10/2002 | Lemcoff | ................ A23B 7/152 62/127 |
| 8,177,883 B2* | 5/2012 | Jorgensen | .......... B65D 81/2076 95/12 |
| 9,205,382 B2 | 12/2015 | Sawamura et al. | |
| 10,034,484 B2* | 7/2018 | Tanaka | ................. F25D 11/003 |
| 2004/0112211 A1 | 6/2004 | Meirav | |
| 2007/0065546 A1 | 3/2007 | Jorgensen et al. | |
| 2008/0034964 A1 | 2/2008 | Schmidt et al. | |
| 2008/0202262 A1 | 8/2008 | Schmidt et al. | |
| 2009/0185948 A1 | 7/2009 | Jorgensen et al. | |
| 2017/0127705 A1 | 5/2017 | Cermak et al. | |
| 2018/0235247 A1 | 8/2018 | Kamei et al. | |
| 2020/0253226 A1* | 8/2020 | Kamei | .................... A23B 7/148 |
| 2020/0282356 A1* | 9/2020 | Kamei | .................... A01F 25/14 |
| 2021/0263492 A1* | 8/2021 | Kamei | ................. A23B 7/0425 |

FOREIGN PATENT DOCUMENTS

| | | |
|---|---|---|
| CN | 101500802 A | 8/2009 |
| EP | 3 054 244 A1 | 8/2016 |
| EP | 3 109 576 A1 | 12/2016 |
| JP | 62-131170 A | 6/1987 |
| JP | 3-53872 A | 3/1991 |
| JP | 2002-263433 A | 9/2002 |
| JP | 2006-166831 A | 6/2006 |
| JP | 2007-215433 A | 8/2007 |
| JP | 2009-174725 A | 8/2009 |
| JP | 2010-246475 A | 11/2010 |
| JP | 2016-70608 A | 5/2016 |
| JP | 2017-125670 A | 7/2017 |
| WO | WO 2007/033668 A1 | 3/2007 |
| WO | WO 2016/205542 A1 | 12/2016 |
| WO | WO 2017/038056 A1 | 3/2017 |

OTHER PUBLICATIONS

International Preliminary Report on Patentability and the Written Opinion of the International Searching Authority (Forms PCT/IB/373 and PCT/ISA/237) for International Application No. PCT/JP2018/036050 dated Mar. 31, 2020.
International Search Report issued in PCT/JP2018/036048 (PCT/ISA/210), dated Dec. 25, 2018.
International Search Report issued in PCT/JP2018/036050 (PCT/ISA/210), dated Dec. 25, 2018.
U.S. Appl. No. 16/651,594, filed Mar. 27, 2020, Not Yet Assigned.
Partial Supplementary European Search Report for European Application No. 18861882.1, dated Oct. 29, 2021.
Partial Supplementary European Search Report for European Application No. 18862355.7, dated Nov. 4, 2021.
Extended European Search Report issued in counterpart European Application No. 18862355.7 dated Mar. 2, 2022.
Extended European Search Report for Application No. EP 18861882.1, dated Feb. 25, 2022.
Extended European Search Report for European Application No. 21175066.6, dated Jun. 23, 2022.

* cited by examiner

GRAPH 1_CA MACHINE CONTROLLABLE RANGE

CA MACHINE CONTROLLABLE RANGE

AIR COMPOSITION ADJUSTING DEVICE

TECHNICAL FIELD

The present disclosure relates to an air composition adjusting device.

BACKGROUND ART

Examples of known air composition adjusting devices include an internal air adjusting device that adjusts the composition of internal air (for example, the oxygen concentration and the carbon dioxide concentration of internal air) of a warehouse or a transport container that contains plants such as agricultural products, in order to suppress decrease of the freshness of the agricultural products and the like.

In PTL 1, a container including a device for adjusting the composition of internal air is disclosed. The device described in PTL 1 adjusts the composition of internal air by using a gas separation membrane.

CITATION LIST

Patent Literature

PTL 1: International Publication No. 2007/033668

SUMMARY OF INVENTION

Technical Problem

In a container having a device of this type, in order to keep the freshness of plants such as agricultural products for a long period, generally, the oxygen concentration of internal air is maintained at an oxygen concentration (for example 5 to 8%) lower than the oxygen concentration of the atmosphere (about 21%), and the carbon dioxide concentration of the internal air is maintained at a concentration higher than that of the atmosphere.

To reduce the carbon dioxide concentration of internal air of the container, carbon dioxide is selectively removed from the air by performing ventilation or by dissolving the carbon dioxide in a liquid by using a scrubber. To increase the oxygen concentration, generally, fresh air is taken into the container by performing ventilation.

However, with the control described above, even when the oxygen concentration needs to be increased, it is not possible to increase the oxygen concentration to such a level that the sum of the oxygen concentration and the carbon dioxide concentration of internal air exceeds 21%, which is shown by a line A in FIG. 9 (to a level exceeding the oxygen concentration in the atmosphere), because the ratio of oxygen removal to carbon dioxide generation due to respiration of plants is 1:1.

An object of the present disclosure is to enable the oxygen concentration of air in a target space, whose composition is adjusted by using an air composition adjusting device, to be higher than the oxygen concentration in the atmosphere.

Solution to Problem

According to a first aspect of the present disclosure, an air composition adjusting device for adjusting composition of air in a target space (5) includes: an oxygen separator (41, 61) that separates oxygen from external air to be supplied to the target space (5); a gas supply path (135) including a high concentration gas supply path (136) for oxygen through which the oxygen separator (41, 61) communicates with the target space (5); and a controller (110) that performs an oxygen concentration raising operation of supplying a high oxygen concentration gas, which has a higher oxygen concentration than external air before being treated by the oxygen separator (41, 61), to the target space (5) through the high concentration gas supply path (136) for oxygen.

With the first aspect, the high oxygen concentration gas is generated when air before being treated passes through the oxygen separator (41, 61), and the high oxygen concentration gas is supplied to the target space (5) through the high concentration gas supply path (136) for oxygen. Accordingly, the oxygen concentration of air in the target space (5), whose composition is adjusted by the air composition adjusting device, can be made higher than the oxygen concentration in the atmosphere.

According to a second aspect of the present disclosure, in the first aspect, the oxygen separator (41, 61) is configured to separate the external air into the high oxygen concentration gas and a low oxygen concentration gas, which has a lower oxygen concentration than external air before being treated; the gas supply path (135) includes a low concentration gas supply path (137) for oxygen that supplies the low oxygen concentration gas to the target space (5), and a switcher (56, 58) that selectively supplies one of the high oxygen concentration gas and the low oxygen concentration gas to the target space (5); and the controller (110) is configured to supply the high oxygen concentration gas or the low oxygen concentration gas to the target space (5) by switching the switcher (56, 58).

With the second aspect, the high oxygen concentration gas or the low oxygen concentration gas can be selectively supplied to the target space (5) by switching the switcher (56, 58).

According to a third aspect of the present disclosure, in the first or second aspect, the oxygen separator (41, 61) includes a separation membrane (85) that separates oxygen from the external air.

With the third aspect, in the air composition adjusting device configured by using the separation membrane (85), the oxygen concentration of air in the target space (5) can be made higher than the oxygen concentration in the atmosphere.

According to a fourth aspect of the present disclosure, in any one of the first to third aspects, the air composition adjusting device further includes: a carbon dioxide separator (41, 61) that separates carbon dioxide from air-to-be-treated to be supplied to the target space (5); and a high concentration gas supply path (136) for carbon dioxide through which the carbon dioxide separator (41, 61) communicates with the target space (5); and the controller (110) is configured to be capable performing, in addition to the oxygen concentration raising operation, a carbon dioxide concentration raising operation of supplying a high carbon dioxide concentration gas, which has a higher carbon dioxide concentration than air-to-be-treated before being treated by the carbon dioxide separator (41, 61), to the target space (5) through the high concentration gas supply path (136) for carbon dioxide.

With the fourth aspect, the high carbon dioxide concentration gas is generated when air before being treated passes through the carbon dioxide separator (41, 61), and the high carbon dioxide concentration gas is supplied to the target space (5) through the high concentration gas supply path (136) for carbon dioxide. Accordingly, the carbon dioxide concentration of air in the target space (5), whose composition is adjusted by the air composition adjusting device, can be made higher than the carbon dioxide concentration of air before being treated.

According to a fifth aspect of the present disclosure, in the fourth aspect, the carbon dioxide separator (41, 61) is configured to separate the air-to-be-treated into the high carbon dioxide concentration gas and a low carbon dioxide concentration gas, which has a lower carbon dioxide concentration than air-to-be-treated before being treated; the gas supply path (135) includes a low concentration gas supply path (137) for carbon dioxide that supplies the low carbon dioxide concentration gas to the target space (5), and a switcher (76, 78) that selectively supplies one of the high carbon dioxide concentration gas and the low carbon dioxide concentration gas to the target space (5); and the controller (110) is configured to be capable of supplying the high carbon dioxide concentration gas or the low carbon dioxide concentration gas to the target space (5) by switching the switcher (76, 78).

With the fifth aspect, the high carbon dioxide concentration gas or the low carbon dioxide concentration gas can be selectively supplied to the target space (5) by switching the switcher (76, 78).

According to a sixth aspect of the present disclosure, in the third aspect, the air composition adjusting device further includes an adsorber (234, 235) that is provided with an adsorbent, that separates nitrogen, oxygen, and carbon dioxide from internal air of the target space, and that is capable of generating a low oxygen concentration gas and a high oxygen concentration gas, the low oxygen concentration gas having a higher nitrogen concentration, a lower oxygen concentration, and a lower carbon dioxide concentration than the internal air, and the high oxygen concentration gas having a lower nitrogen concentration, a higher oxygen concentration, and a higher carbon dioxide concentration than the internal air.

With the sixth aspect, in a configuration such that the internal air adjusting device includes the gas separation membrane (85) as the oxygen separator (61) and further includes the adsorber (234, 235) provided with the adsorbent, as with the third aspect, the oxygen concentration of air in the target space (5) can be made higher than the oxygen concentration in the atmosphere by using the separation membrane (85).

DESCRIPTION OF EMBODIMENTS

First Embodiment

Embodiments will be described in detail with reference to the drawings.

An air composition adjusting device according to the present embodiment is an internal air adjusting device (30) that is provided in a transport container (storage chamber) (1) in order to perform so-called controlled atmosphere (CA) transportation. The internal air adjusting device (30) adjusts the composition of air in the internal space (target space) of the transport container (1) to become different from that of the atmosphere, which is air in the external space, or to return the composition to that of the atmosphere.

Figure 1:
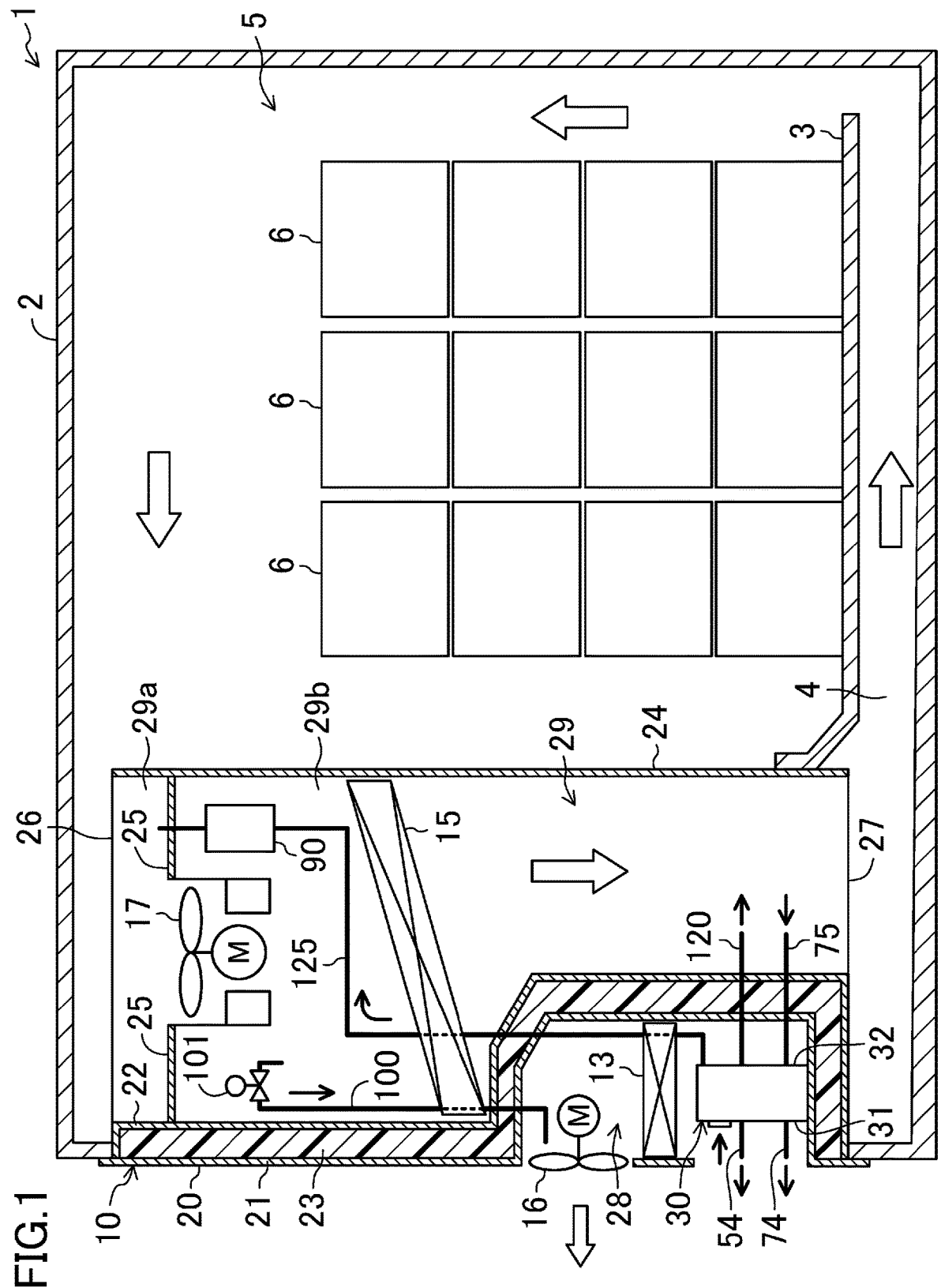
FIG. 1 is a schematic sectional view of a transport container including an internal air adjusting device according to an embodiment.

As illustrated in FIG. 1, the transport container (1), which forms the storage chamber, includes a container body (2) and a container refrigerator (10). The transport container (1) is a reefer container that is capable of controlling the temperature of the internal space. The internal air adjusting device (30) according to the present embodiment is installed in the container refrigerator (10). The transport container (1) is used to transport, as freight (6), plants such as agricultural products that perform respiration by taking in oxygen ($O_2$) and discharging carbon dioxide ($CO_2$). Examples of plants include fruits such as bananas and avocados, vegetables, grains, bulbs, flowers, and the like.

The container body (2) has an elongated rectangular-parallelepiped-box shape. One end surface of the container body (2) is open, and the container refrigerator (10) is attached so as to close the open end. The internal space of the container body (2) serves as a freight chamber (5) for storing the freight (6).

A floor board (3) for loading the freight (6) thereon is disposed in a bottom portion of the freight chamber (5). An underfloor passage (4), for allowing air discharged by the container refrigerator (10) to flow therethrough, is formed between the floor board (3) and a bottom plate of the container body (2). The underfloor passage (4) extends in the longitudinal direction of the container body (2) along the bottom plate of the container body (2). One end of the underfloor passage (4) is connected to a blow-out opening (27) of the container refrigerator (10), and the other end of the underfloor passage (4) communicates with a space above the floor board (3) (that is, a space in which the freight (6) is contained).

—Container Refrigerator—

Figure 2:
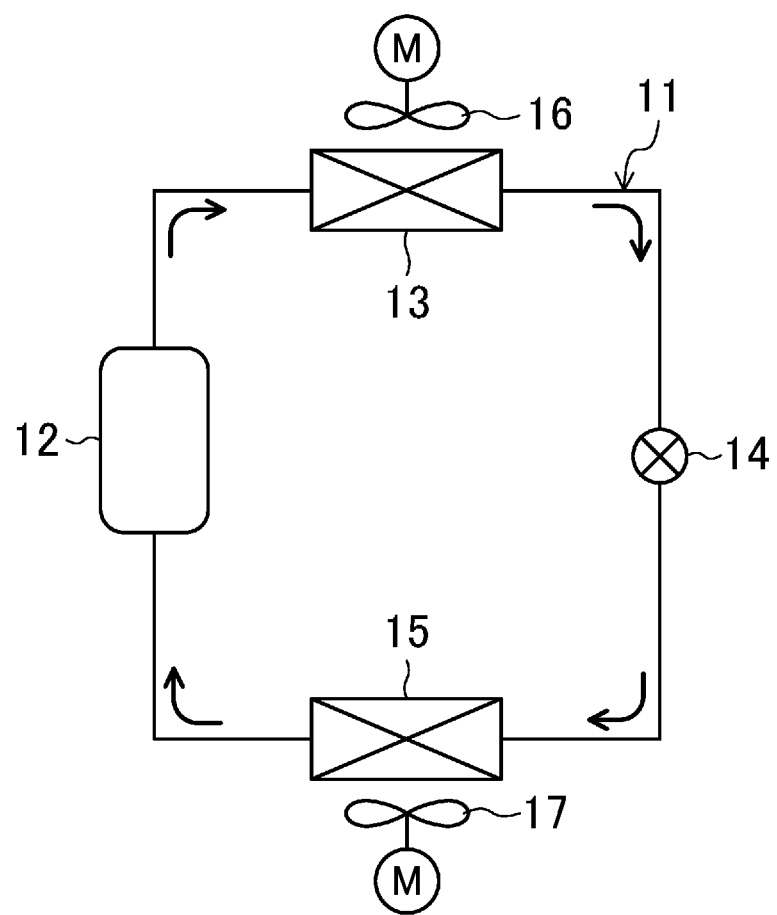
FIG. 2 is a refrigerant circuit diagram illustrating the configuration of a refrigerant circuit of a container refrigerator provided in the transport container.

As illustrated in FIGS. 1 and 2, the container refrigerator (10) includes a casing (20), a refrigerant circuit (11) that performs a refrigeration cycle, an external fan (16), and an internal fan (17).

The casing (20) includes an external wall (21), an internal wall (22), a back plate (24), and a partition plate (25). As described below, the refrigerant circuit (11), the external fan (16), and the internal fan (17) are provided in the casing (20).

The external wall (21) is a plate-shaped member that is disposed so as to cover the open end of the container body (2). A lower part of the external wall (21) bulges inward into the container body (2). The internal wall (22) is a plate-shaped member that extends along the external wall (21). The internal wall (22) is disposed so as to cover the inner surface of the external wall (21) of the container body (2). The space between the external wall (21) and the internal wall (22) is filled with a heat insulator (23).

A lower part of the casing (20) has a shape that is recessed inward into the container body (2). The lower part of the casing (20) forms an external machine chamber (28) that communicates with the external space of the transport container (1). The external fan (16) is disposed in the external machine chamber (28).

The back plate (24) is a substantially rectangular flat-plate-shaped member. The back plate (24) is disposed further inward in the container body (2) than the internal wall (22), and forms an internal air passage (29) between the back plate (24) and the internal wall (22). The upper end of the internal air passage (29) serves as a suction opening (26) of the casing (20), and the lower end of the internal air passage (29) serves as the blow-out opening (27) of the casing (20).

The partition plate (25) is a plate-shaped member that is disposed so as to partition the internal air passage (29) into an upper part and a lower part. The partition plate (25) is disposed in an upper region of the internal air passage (29). The partition plate (25) partitions the internal air passage (29) into a primary passage (29a) above the partition plate (25) and a secondary passage (29b) below the partition plate (25). The primary passage (29a) communicates with the freight chamber (5) via the suction opening (26). The secondary passage (29b) communicates with the underfloor passage (4) via the blow-out opening (27). The internal fan (17) is attached to the partition plate (25). The internal fan (17) is disposed so as to blow out air, which is sucked from the primary passage (29a), to the secondary passage (29b).

As illustrated in FIG. 2, the refrigerant circuit (11) is a closed circuit that is formed by connecting a compressor (12), a condenser (13), an expansion valve (14), and an evaporator (15) with pipes. When the compressor (12) is activated, a refrigerant circulates in the refrigerant circuit (11), and a vapor compression refrigeration cycle is performed. As illustrated in FIG. 1, the condenser (13) is disposed in the external machine chamber (28) on the suction side of the external fan (16), and the evaporator (15) is disposed in the secondary passage (29b) of the internal air passage (29). Although illustration is omitted in FIG. 1, the compressor (12) is disposed in the external machine chamber (28).

—Internal Air Adjusting Device—

Figure 3:
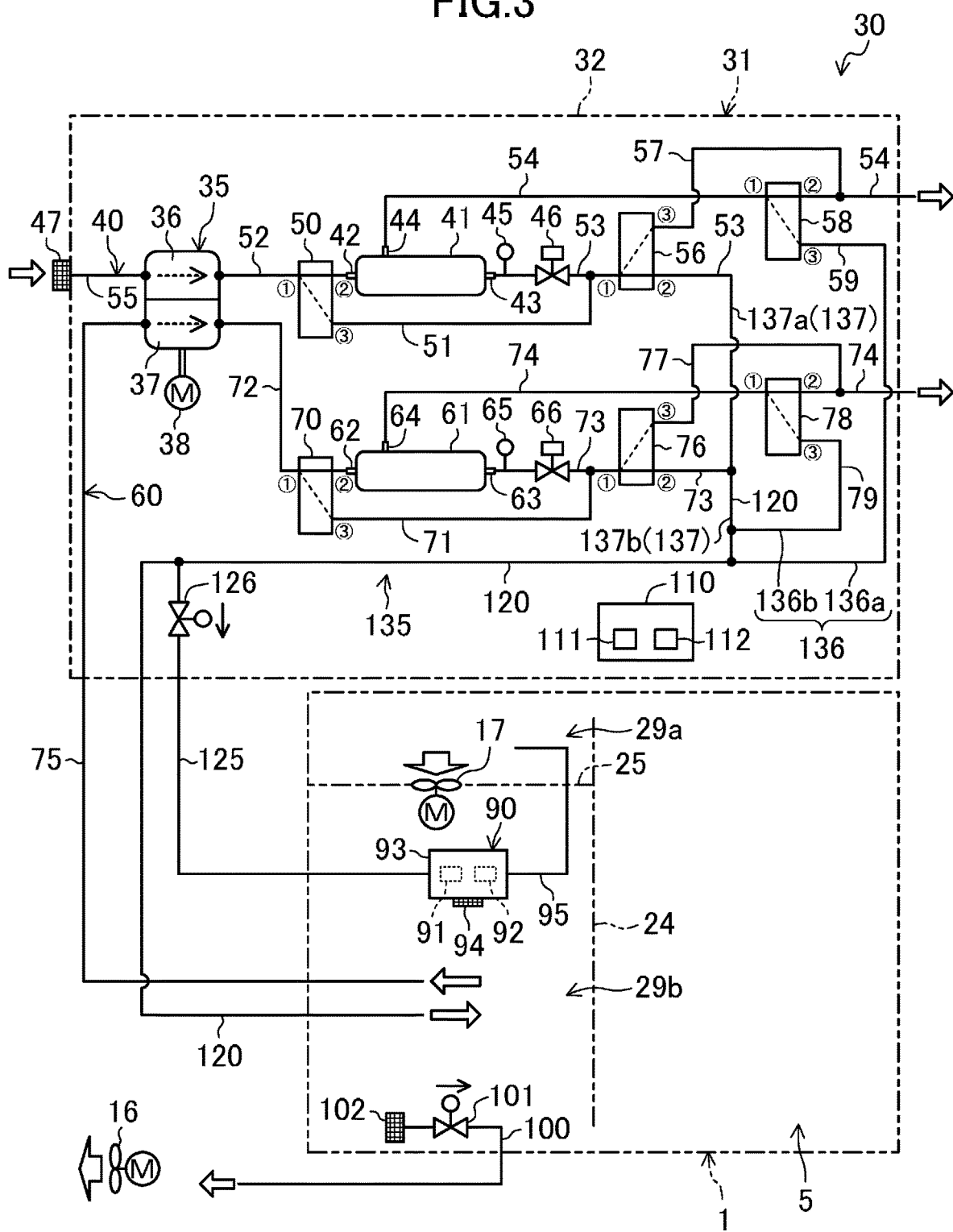
FIG. 3 is a pipe system diagram illustrating the configuration of the internal air adjusting device according to the embodiment.

As illustrated in FIGS. 1 and 3, the internal air adjusting device (30) includes a main unit (31), a sensor unit (90), a ventilation discharge pipe (100), and a controller (110). The main unit (31) is installed in the external machine chamber (28) of the container refrigerator (10). The sensor unit (90) is installed in the internal air passage (29) of the transport container (1). The ventilation discharge pipe (100) is installed in both of the internal air passage (29) and the external machine chamber (28) of the transport container (1). The controller (110) is provided in the main unit (31) and controls the constituent equipment of the internal air adjusting device (30).

As illustrated in FIG. 3, the main unit (31) of the internal air adjusting device (30) includes a first composition adjuster (40), a second composition adjuster (60), a pump unit (35), and a unit case (32). The unit case (32) is a box-shaped hermetically closed vessel. The first composition adjuster (40), the second composition adjuster (60), and the pump unit (35) are disposed in the internal space of the unit case (32). Details of the first composition adjuster (40), the second composition adjuster (60), and the pump unit (35) will be described below. Each of the composition adjusters (40, 60) includes a separator that separates supply air (first external air, second external air, first internal air, and second internal air, described below), which has an oxygen concentration and a carbon dioxide concentration that differ from those of air-to-be-treated (external air, internal air), from the air-to-be-treated; and is configured to be capable of supplying the supply air to the internal space of the transport container (1).

The internal air adjusting device (30) includes a supply pipe (120), an internal-side suction pipe (75), and a measurement pipe (125). The supply pipe (120), the internal-side suction pipe (75), and the measurement pipe (125) are pipes for connecting the main unit (31) to the internal air passage (29) of the container refrigerator (10).

The supply pipe (120) is a pipe for supplying, to the freight chamber (5), air flowed out from the first composition adjuster (40) and the second composition adjuster (60). The inlet end of the supply pipe (120) is connected to the first composition adjuster (40) and the second composition adjuster (60), and the outlet end of the supply pipe (120) opens in the secondary passage (29b) of the internal air passage (29).

The internal-side suction pipe (75) is a pipe for supplying internal air in the freight chamber (5) to the second composition adjuster (60). The inlet end of the internal-side suction pipe (75) opens in the secondary passage (29b) of the internal air passage (29), and the outlet end of the internal-side suction pipe (75) is connected to a second pump (37) of the second composition adjuster (60) described below. In the secondary passage (29b) of the internal air passage (29), the inlet end of the internal-side suction pipe (75) is disposed on the upstream side of the outlet end of the supply pipe (120).

The measurement pipe (125) is a pipe for supplying, to the sensor unit (90), air that flows in the supply pipe (120). The inlet end of the measurement pipe (125) is connected the supply pipe (120), and the outlet end of the measurement pipe (125) is connected to the sensor unit (90). A measurement on-off valve (126), which is an electromagnetic valve, is provided in the measurement pipe (125). The measurement on-off valve (126) is contained in the unit case (32) of the main unit (31).

The ventilation discharge pipe (100), the supply pipe (120), the internal-side suction pipe (75), the measurement pipe (125), and pipes (51 to 55, 57, 59, 71 to 74, 77, 79, 95) provided in the composition adjusters (40, 60), described below, each may be a rigid pipe, a flexible hose, or a combination of a pipe and a hose.

<Pump Unit>

As illustrated in FIG. 3, the pump unit (35) includes a first pump (36), the second pump (37), and a driving motor (38).

The first pump (36) and the second pump (37) are each an air pump that sucks air and discharges the air. The first pump (36) and the second pump (37) are each, for example, a positive-displacement fluid machine. The first pump (36) and the second pump (37) are integrated. The driving motor (38) is an electric motor coupled to the first pump (36) and the second pump (37). The driving motor (38) drives both of the first pump (36) and the second pump (37).

<First Composition Adjuster)

The first composition adjuster (40) is configured to separate external air (untreated external air) sucked from the outside of the transport container (1) into first external air (low oxygen concentration gas) and second external air (high oxygen concentration gas). The first composition adjuster (40) according to the present embodiment can supply the first external air, which is supply air, to the freight chamber (5) and discharge the second external air to the outside of the transport container (1); and can discharge the first external air to the outside and supply the second external air to the freight chamber (5).

The first composition adjuster (40) includes an air filter (47), a first separation module (first separator: an oxygen separator and a carbon dioxide separator that separate oxygen and carbon dioxide from air before being treated) (41), a first bypass valve (50), a first pressure sensor (45), and a first control valve (46). The first composition adjuster (40) includes an external-side suction pipe (55), a first inlet pipe (52), a first primary-side pipe (53), a first secondary-side pipe (54), and a first bypass pipe (51). The first pump (36) of the pump unit (35) constitutes the first composition adjuster (40).

The air filter (47) is a membrane filter for trapping dust and salt included in external air. The air filter (47) is attached to the unit case (32) of the main unit (31). The air filter (47) is connected to the suction opening of the first pump (36) via the external-side suction pipe (55). In the internal air adjusting device (30) according to the present embodiment, the external-side suction pipe (55) may be omitted, and the air filter (47) and the first pump (36) may communicate with each other via the internal space of the unit case (32), which is a hermetically closed vessel.

As will be described below in detail, the first separation module (41) includes a first inlet (42), a first primary-side outlet (43), and a first secondary-side outlet (44). The first inlet (42) is connected to the discharge opening of the first pump (36) via the first inlet pipe (52). The first primary-side outlet (43) is connected to the supply pipe (120) via the first primary-side pipe (53). One end of the first secondary-side pipe (54) is connected to the first secondary-side outlet (44). The first secondary-side pipe (54) extends to the outside of the unit case (32). The other end of the first secondary-side pipe (54) opens in the external machine chamber (28) on the suction side of the external fan (16).

The first bypass valve (50) is a switching valve having three ports and constitutes a first bypass valve mechanism. The first bypass valve (50) is configured to be switched between: a first state (shown by a solid line in FIG. 3), in which the first port communicates with the second port and is shut off from the third port; and a second state (shown by a broken line in FIG. 3), in which the first port communicates with the third port and is shut off from the second port.

The first bypass valve (50) is disposed in a middle part of the first inlet pipe (52). The first port of the first bypass valve (50) is connected to the discharge opening of the first pump (36), and the second port of the first bypass valve (50) is connected to the first inlet (42) of the first separation module (41). The inlet end of the first bypass pipe (51) is connected to the third port of the first bypass valve (50). The outlet end of the first bypass pipe (51) is connected to the first primary-side pipe (53). The first bypass pipe (51) constitutes a first bypass passage.

The first pressure sensor (45) and the first control valve (46) are provided in the first primary-side pipe (53). The first pressure sensor (45) and the first control valve (46) are disposed closer to the first separation module (41) than the other end of the first bypass pipe (51) connected to the first primary-side pipe (53). The first pressure sensor (45) is disposed closer to the first separation module (41) than the first control valve (46).

The first pressure sensor (45) measures the pressure of first external air flowed out from the first primary-side outlet (43) of the first separation module (41). The measurement value of the first pressure sensor (45) is substantially equal to the pressure of untreated external air that the first pump (36) supplies to the first separation module (41).

The first control valve (46) is a motor-operated valve whose opening degree is variable and constitutes a first valve mechanism. When the opening degree of the first control valve (46) is changed, the pressure of untreated external air that the first pump (36) supplies to the first separation module (41) changes.

The first separation module (41) constitutes a first separator. As will be described below in detail, the first separation module (41) includes gas separation membranes (85). The first separation module (41) separates untreated external air into first external air, which has not permeated through the gas separation membranes (85) (air that flows in the first primary-side pipe (53)), and second external air, which has permeated through the gas separation membranes (85) (air that flows in the first secondary-side pipe (54)).

First external air (low oxygen concentration gas) has a higher nitrogen concentration than untreated external air, and has a lower oxygen concentration than untreated external air. Second external air (high oxygen concentration gas) has a lower nitrogen concentration than untreated external air, and has a higher oxygen concentration than untreated external air. Thus, the first external air and the second external air differ from each other in the concentrations of constituent substances thereof. In the present specification, the term "concentration" means volume ratio.

In the first composition adjuster (40), a first primary-side switching valve (56), a first primary-side discharge pipe (57), a first secondary-side switching valve (58), and a first secondary-side supply pipe (59) are provided.

The first primary-side switching valve (56) and the first secondary-side switching valve (58) are each a switching valve having three ports. The first primary-side switching valve (56) and the first secondary-side switching valve (58) are each configured to be switched between: a first state (shown by a solid line in FIG. 3), in which the first port communicates with the second port and is shut off from the third port; and a second state (shown by a broken line in FIG. 3), in which the first port communicates with the third port and is shut off from the second port.

The first primary-side switching valve (56) is disposed in a middle part of the first primary-side pipe (53). In the first primary-side pipe (53), the first primary-side switching valve (56) is disposed closer to the supply pipe (120) than the outlet end of the first bypass pipe (51). The first port of the first primary-side switching valve (56) is connected to the first control valve (46), and the second port of the first primary-side switching valve (56) is connected to the supply pipe (120). One end of the first primary-side discharge pipe (57) is connected to the third port of the first primary-side switching valve (56). The other end of the first primary-side discharge pipe (57) is connected to the first secondary-side pipe (54).

The first secondary-side switching valve (58) is disposed in a middle part of the first secondary-side pipe (54). In the first secondary-side pipe (54), the first secondary-side switching valve (58) is disposed closer to the first separation module (41) than the other end of the first primary-side discharge pipe (57). The first port of the first secondary-side switching valve (58) is connected to the first secondary-side outlet (44) of the first separation module (41), and the second port of the first secondary-side switching valve (58) communicates with the external machine chamber (28) of the transport container (1) via the first secondary-side pipe (54). One end of the first secondary-side supply pipe (59) is connected to the third port of the first secondary-side switching valve (58). The other end of the first secondary-side supply pipe (59) is connected to the supply pipe (120).

<Second Composition Adjuster)

The second composition adjuster (60) is configured to separate internal air (untreated internal air) sucked from the internal space of the transport container (1) into first internal air (low oxygen concentration gas, low carbon dioxide concentration gas) and second internal air (high oxygen concentration gas, high carbon dioxide concentration gas). The second composition adjuster (60) according to the present embodiment can supply the first internal air, which is supply air, to the freight chamber (5) and discharge the second internal air to the outside of the transport container (1); and can discharge the first internal air to the outside and supply the second internal air to the freight chamber (5).

The second composition adjuster (60) includes a second separation module (second separator: an oxygen separator and a carbon dioxide separator that separate oxygen and carbon dioxide from air before being treated) (61), a second bypass valve (70), a second pressure sensor (65), and a second control valve (66). The second composition adjuster (60) includes a second inlet pipe (72), a second primary-side pipe (73), a second secondary-side pipe (74), and a second bypass pipe (71). The second pump (37) of the pump unit (35) constitutes the second composition adjuster (60).

As will be described below in detail, the second separation module (61) includes a second inlet (62), a second primary-side outlet (63), and a second secondary-side outlet (64). The second inlet (62) is connected to the discharge opening of the second pump (37) via the second inlet pipe (72). The second primary-side outlet (63) is connected to the supply pipe (120) via the second primary-side pipe (73). One end of the second secondary-side pipe (74) is connected to the second secondary-side outlet (64). The second secondary-side pipe (74) extends to the outside of the unit case (32). The other end of the second secondary-side pipe (74) opens in the external machine chamber (28) on the suction side of the external fan (16). The internal-side suction pipe (75) is connected to the suction opening of the second pump (37).

The second bypass valve (70) is a switching valve having three ports and constitutes a second bypass valve mechanism. The second bypass valve (70) is configured to be switched between: a first state (shown by a solid line in FIG. 3), in which the first port communicates with the second port and is shut off from the third port; and a second state (shown by a broken line in FIG. 3), in which the first port communicates with the third port and is shut off from the second port.

The second bypass valve (70) is disposed in a middle part of the second inlet pipe (72). The first port of the second bypass valve (70) is connected to the discharge opening of the second pump (37), and the second port of the second bypass valve (70) is connected to the second inlet (62) of the second separation module (61). The inlet end of the second bypass pipe (71) is connected to the third port of the second bypass valve (70). The outlet end of the second bypass pipe (71) is connected to the second primary-side pipe (73). The second bypass pipe (71) constitutes a second bypass passage.

The second pressure sensor (65) and the second control valve (66) are provided in the second primary-side pipe (73). The second pressure sensor (65) and the second control valve (66) are disposed closer to the second separation module (61) than the other end of the second bypass pipe (71) connected to the second primary-side pipe (73). The second pressure sensor (65) is disposed closer to the second separation module (61) than the second control valve (66).

The second pressure sensor (65) measures the pressure of second external air flowed out from the second primary-side outlet (63) of the second separation module (61). The measurement value of the second pressure sensor (65) is substantially equal to the pressure of untreated internal air that the second pump (37) supplies to the second separation module (61).

The second control valve (66) is a motor-operated valve whose opening degree is variable and constitutes a second valve mechanism. When the opening degree of the second control valve (66) is changed, the pressure of untreated internal air that the second pump (37) supplies to the second separation module (61) changes.

The second separation module (61) constitutes a second separator. As will be described below in detail, the second separation module (61) includes gas separation membranes (85). The second separation module (61) separates untreated internal air into first internal air, which has not permeated through the gas separation membranes (85) (air that flows in the second primary-side pipe (73)), and second internal air, which has permeated through the gas separation membranes (85) (air that flows in the second secondary-side pipe (74)).

First internal air (low oxygen concentration gas, low carbon dioxide concentration gas) has a higher nitrogen concentration than untreated internal air, and has a lower oxygen concentration and a lower carbon dioxide concentration than untreated internal air. Second internal air (high oxygen concentration gas, high carbon dioxide concentration gas) has a lower nitrogen concentration than untreated internal air, and has a higher oxygen concentration and a higher carbon dioxide concentration than untreated internal air. Thus, the first internal air and the second internal air differ from each other in the concentrations of constituent substances thereof.

In the second composition adjuster (60), a second primary-side switching valve (76), a second primary-side discharge pipe (77), a second secondary-side switching valve (78), and a second secondary-side supply pipe (79) are provided.

The second primary-side switching valve (76) and the second secondary-side switching valve (78) are each a switching valve having three ports. The second primary-side switching valve (76) and the second secondary-side switching valve (78) are each configured to be switched between: a first state (shown by a solid line in FIG. 3), in which the first port communicates with the second port and is shut off from the third port; and a second state (shown by a broken line in FIG. 3), in which the first port communicates with the third port and is shut off from the second port.

The second primary-side switching valve (76) is disposed in a middle part of the second primary-side pipe (73). In the second primary-side pipe (73), the second primary-side switching valve (76) is disposed closer to the supply pipe (120) than the outlet end of the second bypass pipe (71). The first port of the second primary-side switching valve (76) is connected to the second control valve (66), and the second port of the second primary-side switching valve (76) is connected to the supply pipe (120). One end of the second primary-side discharge pipe (77) is connected to the third port of the second primary-side switching valve (76). The other end of the second primary-side discharge pipe (77) is connected to the second secondary-side pipe (74).

The second secondary-side switching valve (78) is disposed in a middle part of the second secondary-side pipe (74). In the second secondary-side pipe (74), the second secondary-side switching valve (78) is disposed closer to the second separation module (61) than the other end of the second primary-side discharge pipe (77). The first port of the second secondary-side switching valve (78) is connected to the second secondary-side outlet (64) of the second separation module (61), and the second port of the second secondary-side switching valve (78) communicates with the external machine chamber (28) of the transport container (1) via the second secondary-side pipe (74). One end of the second secondary-side supply pipe (79) is connected to the third port of the second secondary-side switching valve (78). The other end of the second secondary-side supply pipe (79) is connected to the supply pipe (120).

<Separation Module>

Figure 4:
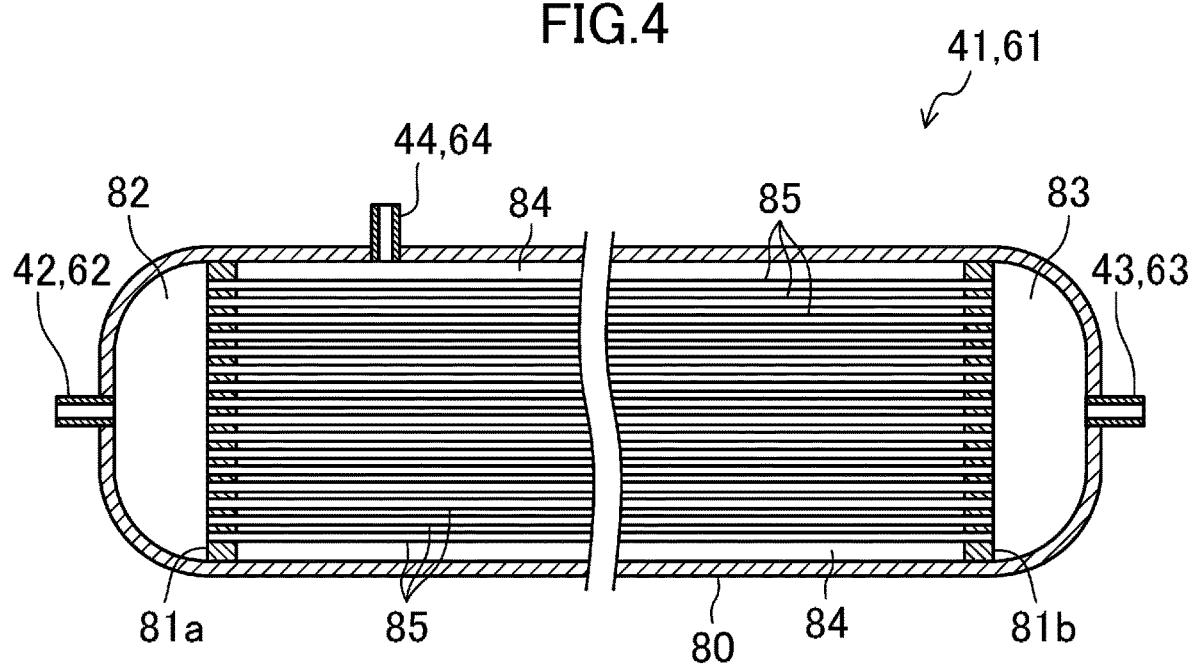
FIG. 4 is a schematic sectional view of a separation module provided in the internal air adjusting device according to the embodiment.

Referring to FIG. 4, the structure of the first separation module (41) and the second separation module (61) will be described. The first separation module (41) and the second separation module (61) have the same structure.

Each of the separation modules (41, 61) includes one tubular case (80) and two partition walls (81*a*, 81*b*). The tubular case (80) is an elongated cylindrical vessel both ends of which are closed. The partition walls (81*a*, 81*b*) are members for partitioning the internal space of the tubular case (80) and are provided so as to extend across the internal space of the tubular case (80). The partition walls (81*a*, 81*b*) are disposed respectively at a position near one end and a position near the other end of the internal space of the tubular case (80). In FIG. 4, the internal space of the tubular case (80) is partitioned into an inlet chamber (82) that is positioned on the left side of the left partition wall (81*a*), a secondary-side outlet chamber (84) that is positioned between the two partition walls (81*a*, 81*b*), and a primary-side outlet chamber (83) that is positioned on the right side of the right partition wall (81*b*).

Each of the separation modules (41, 61) includes a large number of hollow-fiber gas separation membranes (85) (each shaped like a very thin tube having an outside diameter of 1 mm or smaller). The hollow-fiber gas separation membranes (85) are provided so as to extend from one of one partition wall (81*a*) to the other partition wall (81*b*). One end portion of each gas separation membrane (85) extends through the one partition wall (81*a*) and opens in the inlet chamber (82), and the other end portion of each gas separation membrane (85) extends through the other partition wall (81*b*) and opens in the primary-side outlet chamber (83). A part of the internal space of the tubular case (80) that is interposed between the two partition walls (81*a*, 81*b*) and that is outside of the gas separation membranes (85) constitutes the secondary-side outlet chamber (84). In each of the separation modules (41, 61), the inlet chamber (82) and the primary-side outlet chamber (83) communicate with each other via the hollow-fiber gas separation membranes (85), while the secondary-side outlet chamber (84) does not communicate with the spaces inside of the gas separation membranes (85), the inlet chamber (82), and the primary-side outlet chamber (83).

In the tubular case (80), the inlet (42, 62), the primary-side outlet (43, 63), and the secondary-side outlet (44, 64) are provided. The inlet (42, 62) is disposed in a left end portion of the tubular case (80) in FIG. 4, and communicates with the inlet chamber (82). The primary-side outlet (43, 63) is disposed in a right end portion of the tubular case (80) in FIG. 4, and communicates with the primary-side outlet chamber (83). The secondary-side outlet (44, 64) is disposed in a middle part of the tubular case (80) in the longitudinal direction, and communicates with the secondary-side outlet chamber (84).

Each gas separation membrane (85) is a porous membrane made of a polymer. The gas separation membrane (85) separates substances included in a mixed gas by using the difference in rate (permeation rate) at which molecules of the substances permeate through the gas separation membrane (85).

In the internal air adjusting device (30) according to the present embodiment, the same gas separation membranes (85) are provided in the first separation module (41) and the second separation module (61) respectively. The gas separation membranes (85) of each of the separation modules (41, 61) have a property that the nitrogen permeation rate is lower than both of the oxygen permeation rate and the carbon dioxide permeation rate. The large number of hollow-fiber gas separation membranes (85) have substantially the same membrane thickness. Accordingly, the gas separation membranes (85) provided in each of the separation modules (41, 61) have a property that the nitrogen permeability is lower than both of the oxygen permeability and the carbon dioxide permeability.

In each of the separation modules (41, 61), air flowed into the inlet chamber (82) through the inlet (42, 62) flows in the spaces inside of the hollow-fiber gas separation membranes (85) toward the primary-side outlet chamber (83). A part of air that flows in the spaces inside of the gas separation membranes (85) permeates through the gas separation membranes (85) and moves to the secondary-side outlet chamber (84), and the remaining part of the air flows into the primary-side outlet chamber (83).

The gas separation membranes (85) of each of the separation modules (41, 61) have a nitrogen permeability lower than the oxygen permeability and the carbon dioxide permeability. That is, nitrogen does not easily permeate through the gas separation membrane (85) compared with oxygen and carbon dioxide. Therefore, as air that flows in the inside of the hollow-fiber gas separation membranes (85) approaches the primary-side outlet chamber (83), the nitrogen concentration increases, and simultaneously the oxygen concentration and the carbon dioxide concentration decrease. Oxygen and carbon dioxide included in air that flows in the hollow-fiber gas separation membranes (85) permeate through the gas separation membranes (85) and move to the secondary-side outlet chamber (84).

As a result, air flowed into the primary-side outlet chamber (83) without permeating through the gas separation membranes (85) has a higher nitrogen concentration than air in the inlet chamber (82), and has a lower oxygen concentration and a lower carbon dioxide concentration than air in the inlet chamber (82). Air permeated through the gas separation membranes (85) and moved to the secondary-side outlet chamber (84) has a lower nitrogen concentration than air in the inlet chamber (82), and has a higher oxygen concentration and a higher carbon dioxide concentration than air in the inlet chamber (82).

In the first separation module (41), untreated external air flows from the first inlet (42) into the inlet chamber (82), air flowed into the primary-side outlet chamber (83) without permeating through the gas separation membranes (85) flows out from the first primary-side outlet (43) as first external air, and air permeated through the gas separation membranes (85) and flowed into the secondary-side outlet chamber (84) flows out from the first secondary-side outlet (44) as second external air. In the second separation module (61), untreated internal air flows from the second inlet (62) into the inlet chamber (82), air flowed into the primary-side outlet chamber (83) without permeating through the gas separation membranes (85) flows out from the second primary-side outlet (63) as first internal air, and air permeated through the gas separation membranes (85) and flowed into the secondary-side outlet chamber (84) flows out from the second secondary-side outlet (64) as second internal air.

<Sensor Unit>

As illustrated in FIGS. 1 and 3, the sensor unit (90) is disposed in the secondary passage (29b) of the internal air passage (29) of the container refrigerator (10). As illustrated in FIG. 3, the sensor unit (90) includes an oxygen sensor (91), a carbon dioxide sensor (92), and a sensor case (93).

The oxygen sensor (91) is a zirconia electric-current sensor that measures the oxygen concentration of a mixed gas such as air. The carbon dioxide sensor (92) is a non-dispersive infrared (NDIR) sensor that measures the carbon dioxide concentration of a mixed gas such as air. The oxygen sensor (91) and the carbon dioxide sensor (92) are contained in the sensor case (93).

The sensor case (93) is a slightly elongated box-shaped member. The outlet end of the measurement pipe (125) is connected to one end of the sensor case (93) in the longitudinal direction, and one end of an outlet pipe (95) is connected to the other end of the measurement pipe (125). The other end of the outlet pipe (95) opens in the primary passage (29a) of the internal air passage (29). An air filter (94), for introducing internal air that flows in the internal air passage (29) into the internal space of the sensor case (93), is attached to the sensor case (93). The air filter (94) is a membrane filter for trapping dust and the like included in internal air.

As described below, while the internal fan (17) is operating, the air pressure of the secondary passage (29b) is slightly higher than the air pressure of the primary passage (29a). Therefore, when the measurement on-off valve (126) is in a closed state, internal air of the secondary passage (29b) flows into the sensor case (93) through the air filter (94), and then flows into the primary passage (29a) through the outlet pipe (95). In this state, the oxygen sensor (91) of the sensor unit (90) measures the oxygen concentration of internal air, and the carbon dioxide sensor (92) of the sensor unit (90) measures the carbon dioxide concentration of internal air.

<Ventilation Discharge Pipe>

The ventilation discharge pipe (100) is a pipe for connecting the inside and the outside of the transport container (1) to each other. The ventilation discharge pipe (100) constitutes a ventilation discharge passage. As illustrated in FIG. 1, the ventilation discharge pipe (100) extends through the casing (20) of the container refrigerator (10). One end of the ventilation discharge pipe (100) opens in the secondary passage (29b) of the internal air passage (29). The other end of the ventilation discharge pipe (100) opens in the external machine chamber (28) on the suction side of the external fan (16).

As illustrated in FIG. 3, an air filter (102) is attached to one end of the ventilation discharge pipe (100). The air filter (102) is a membrane filter for trapping dust and the like included in internal air. A ventilation discharge valve (101) is provided in the ventilation discharge pipe (100). The ventilation discharge valve (101) is an electromagnetic on-off valve.

<Gas Supply Path>

In the present embodiment, a gas supply path (135) (a high concentration gas supply path (136) and a low concentration gas supply path (137)) is constituted by the external-side suction pipe (55), the first inlet pipe (52), the first primary-side pipe (53), the internal-side suction pipe (75), the second inlet pipe (72), the second primary-side pipe (73), and the supply pipe (120). The gas supply path (135) is a path through which the first separation module (41) and the second separation module (61), each of which is a separator, and the freight chamber (5), which is a target space, communicate with each other. The high concentration gas supply path (136) includes a first high concentration gas supply path (136a) and a second high concentration gas supply path (136b) that respectively supply a high oxygen concentration gas and a high carbon dioxide concentration gas to the internal space. The low concentration gas supply path (137) includes a first low concentration gas supply path (137a) and a second low concentration gas supply path (137b) that respectively supply a low oxygen concentration gas and a low carbon dioxide concentration gas to the internal space.

The high concentration gas supply path (136) serves as a high concentration gas supply path (136) for oxygen when a high oxygen concentration gas flows therethrough, and serves as a high concentration gas supply path (136) for carbon dioxide when a high carbon dioxide concentration gas flows therethrough. Although the same numerals are used because these are the same passage, different names are used because different gasses flow therethrough. The low concentration gas supply path (137) serves as a low concentration gas supply path (137) for oxygen when a low oxygen concentration gas flows therethrough, and serves as a low concentration gas supply path (137) for carbon dioxide when a low carbon dioxide concentration gas flows therethrough. Although the same numerals are used because these are the same passage, different names are used because different gasses flow therethrough.

<Controller>

The controller (110) includes a CPU (111) that performs a control operation and a memory (112) that stores data and the like that are necessary for the control operation. Measurement values of the oxygen sensor (91), the carbon dioxide sensor (92), the first pressure sensor (45), and the second pressure sensor (65) are input to the controller (110). The controller (110) performs a control operation for operating the pump unit (35), the first control valve (46), the second control valve (66), the first bypass valve (50), the second bypass valve (70), and the ventilation discharge valve (101). The CPU (111) also functions as a concentration raising controller that performs an oxygen concentration raising operation (an oxygen concentration rapidly-increasing operation) and a carbon dioxide concentration raising operation for increasing the oxygen concentration and the carbon dioxide concentration of the internal space.

In the present embodiment, the first separator (41) separates oxygen and carbon dioxide from external air, which is air-to-be-treated to be supplied to the internal space that is a target space, and the second separator (61) separates oxygen and carbon dioxide from internal air, which is air-to-be-treated to be taken out from the internal space and supplied (returned) to the external space. The controller (110) is configured to be capable of performing an oxygen concentration increasing operation (an oxygen concentration increasing operation and an oxygen concentration rapidly-increasing operation (an oxygen concentration raising operation)) of supplying a high oxygen concentration gas, which has a higher oxygen concentration than external air before being treated by the first separator (41), to the freight chamber (5) through the high concentration gas supply path (136a); and a carbon dioxide concentration raising operation of supplying a high carbon dioxide concentration gas, which has a higher carbon dioxide concentration than external air before being treated by the first separator (41), to the freight chamber (5) through the high concentration gas supply path (136a).

<Switcher>

The first separator (41) is configured to separate external air, which is the air-to-be-treated, into a high concentration gas, which has a higher oxygen concentration and a higher carbon dioxide concentration than external air before being treated, and a low concentration gas, which has a lower oxygen concentration and a lower carbon dioxide concentration than external air before being treated. In the first composition adjuster (40), the first primary-side switching valve (56) and the first secondary-side switching valve (58) are provided as a first switcher that selectively supplies one of a high concentration gas (a high oxygen concentration gas and a high carbon dioxide concentration gas) and a low concentration gas (a low oxygen concentration gas and a low carbon dioxide concentration gas) to the freight chamber (5). The controller (110) is configured to be capable of supplying the high concentration gas or the low concentration gas to the target space by switching the first switcher (56, 58).

The second separator (61) is configured to separate internal air, which is the air-to-be-treated, into a high concentration gas, which has a higher oxygen concentration and a higher carbon dioxide concentration than internal air before being treated, and a low concentration gas, which has a lower oxygen concentration and a lower carbon dioxide concentration than internal air before being treated. In the second composition adjuster (60), the second primary-side switching valve (76) and the second secondary-side switching valve (78) are provided as a second switcher that selectively supplies one of a high concentration gas (a high oxygen concentration gas and a high carbon dioxide concentration gas) and a low concentration gas (a low oxygen concentration gas and a low carbon dioxide concentration gas) to the freight chamber (5). The controller (110) is configured to be capable of supplying the high concentration gas or the low concentration gas to the target space by switching the second switcher (76, 78).

—Driving Operation of Container Refrigerator—

The container refrigerator (10) performs a cooling operation of cooling internal air of the transport container (1).

In the cooling operation, the compressor (12) of the refrigerant circuit (11) is activated, a refrigerant circulates in the refrigerant circuit (11), and thus a vapor compression refrigeration cycle is performed. In the refrigerant circuit (11), a refrigerant discharged from the compressor (12) passes through the condenser (13), the expansion valve (14), and the evaporator (15) in order, and then is sucked into the compressor (12) and compressed.

In the cooling operation, the external fan (16) and the internal fan (17) are activated. When the external fan (16) is activated, external air outside of the transport container (1) is sucked into the external machine chamber (28) and passes through the condenser (13). In the condenser (13), the refrigerant releases heat to the external air and condensates. When the internal fan (17) is activated, internal air in the freight chamber (5) of the transport container (1) is sucked into the internal air passage (29) and passes through the evaporator (15). In the evaporator (15), the refrigerant absorbs heat from the internal air and evaporates.

Flow of internal air will be described. Internal air that is present in the freight chamber (5) flows into the primary passage (29a) of the internal air passage (29) through the suction opening (26), and is blown out to the secondary passage (29b) by the internal fan (17). The internal air flowed into the secondary passage (29b) is cooled while passing through the evaporator (15), then is blow out from the blow-out opening (27) to the underfloor passage (4), and flows into the freight chamber (5) through the underfloor passage (4).

In the internal air passage (29), the primary passage (29a) is positioned on the suction side of the internal fan (17), and the secondary passage (29b) is positioned on the blow-out side of the internal fan (17). Therefore, while the internal fan (17) is operating, the air pressure in the secondary passage (29b) is slightly higher than the air pressure in the primary passage (29a).

—Driving Operation of Internal Air Adjusting Device—

The internal air adjusting device (30) performs an operation for adjusting the composition of internal air (in the present embodiment, the oxygen concentration and the carbon dioxide concentration of internal air) in the freight chamber (5) of the transport container (1). Here, regarding the driving operation of the internal air adjusting device (30) according to the present embodiment, a case where the target range of the oxygen concentration of internal air is 5%±1% and the target range of the carbon dioxide concentration of internal air is 2%±1% will be described as an example.

<Outline of Driving Operation of Internal Air Adjusting Device>

The internal air adjusting device (30) according to the present embodiment performs: an oxygen concentration reducing operation for reducing the oxygen concentration of internal air in the freight chamber (5); a carbon dioxide concentration reducing operation for reducing the carbon dioxide concentration of internal air in the freight chamber (5); and an oxygen concentration increasing operation for increasing the oxygen concentration of internal air in the freight chamber (5).

At the time when loading of the freight (6) on the transport container (1) has been finished, the composition of internal air that is present in the freight chamber (5) is substantially the same as the composition of the atmosphere (nitrogen concentration: 78%, oxygen concentration: 21%, carbon dioxide concentration: 0.04%). Therefore, the internal air adjusting device (30) performs an oxygen concentration reducing operation for reducing the oxygen concentration of internal air. When the oxygen concentration of internal air reaches the upper limit value (6%) of the target range, the internal air adjusting device (30) stops the oxygen concentration reducing operation.

After the oxygen concentration of internal air has reached 6% and the internal air adjusting device (30) has stopped the oxygen concentration reducing operation, the oxygen concentration of internal air gradually decreases and simultaneously the carbon dioxide concentration of internal air gradually increases due to respiration of plants that are the freight (6).

When the carbon dioxide concentration of internal air reaches the upper limit value (3%) of the target range, the internal air adjusting device (30) performs a carbon dioxide concentration reducing operation for reducing the carbon dioxide concentration of internal air. When the carbon dioxide concentration of internal air reaches the lower limit value (1%) of the target range, the internal air adjusting device (30) stops the carbon dioxide concentration reducing operation.

When the oxygen concentration of internal air reaches the lower limit value (4%) of the target range, the internal air adjusting device (30) performs an oxygen concentration increasing operation for increasing the oxygen concentration of internal air. When the oxygen concentration of internal air reaches the upper limit value (6%) of the target range, the internal air adjusting device (30) stops the oxygen concentration increasing operation.

Thus, the internal air adjusting device (30) performs an oxygen concentration reducing operation to reduce the oxygen concentration of internal air in the freight chamber (5) from 21% (the oxygen concentration of the atmosphere) to a level within the target range. Moreover, the internal air adjusting device (30) repeatedly performs, as necessary, the carbon dioxide concentration reducing operation and the oxygen concentration increasing operation in order to maintain the oxygen concentration and the carbon dioxide concentration of internal air in the freight chamber (5) respectively at levels within their target ranges.

<Oxygen Concentration Reducing Operation>

Figure 5:
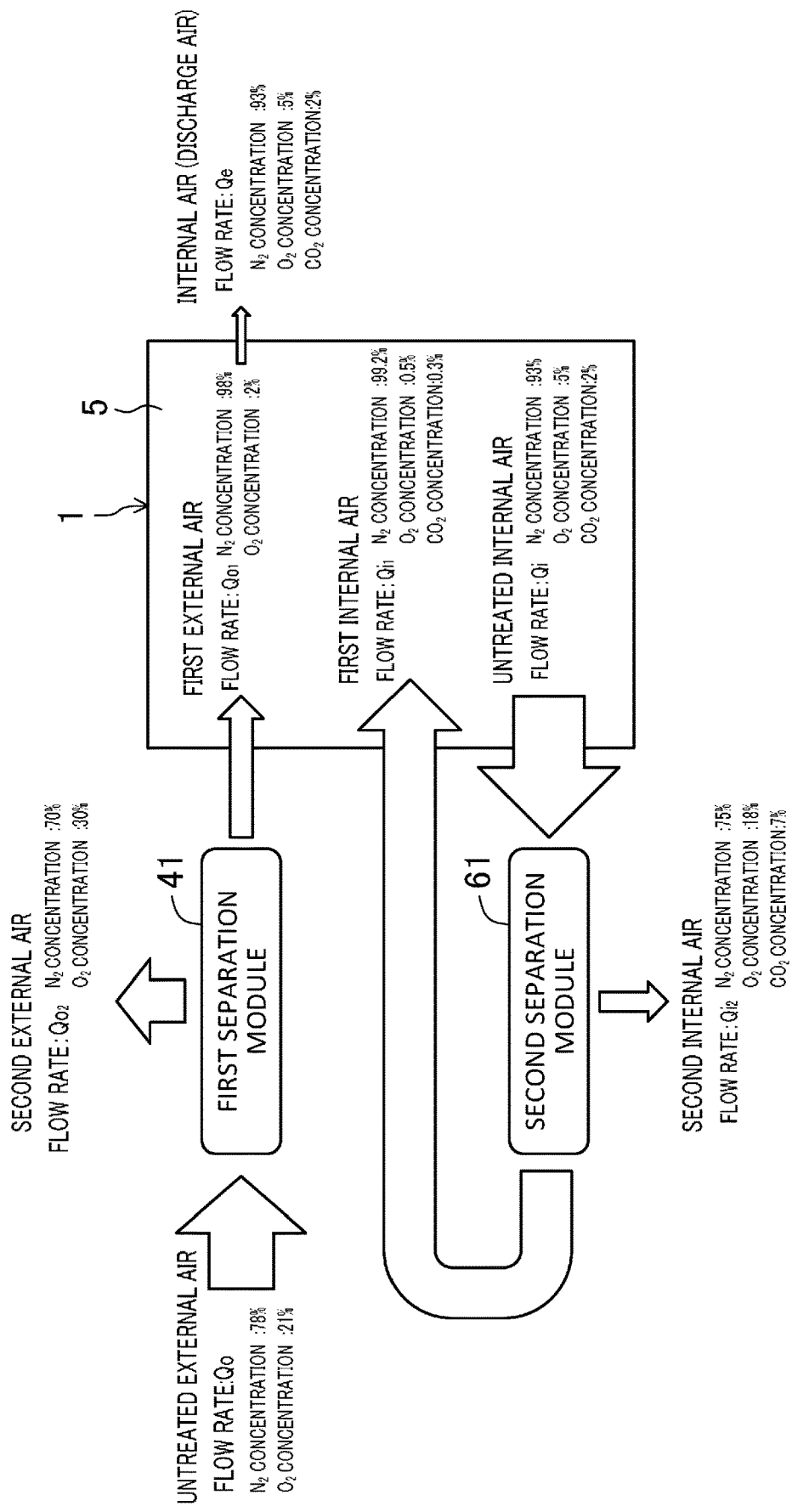
FIG. 5 is a block diagram illustrating an oxygen concentration reducing operation performed by the internal air adjusting device according to the embodiment.

Referring to FIGS. 3 to 5 as necessary, the oxygen concentration reducing operation of the internal air adjusting device (30) will be described. In the oxygen concentration reducing operation, the first composition adjuster (40) supplies first external air, which has a low oxygen concentration, to the freight chamber (5); and the second composition adjuster (60) supplies first internal air, which has a low oxygen concentration, to the freight chamber (5).

In the oxygen concentration reducing operation, the controller (110) sets each of the first bypass valve (50) and the second bypass valve (70) to be in a first state (the state shown by a solid line in FIG. 3), activates the first pump (36) and the second pump (37) by energizing the driving motor (38) of the pump unit (35), and sets the ventilation discharge valve (101) to be in an open state. The first primary-side switching valve (56), the first secondary-side switching valve (58), the second primary-side switching valve (76), and the second secondary-side switching valve (78) are all set to be in the first state.

First, when the first pump (36) is activated, external air that is present outside of the transport container (1) is sucked into the first pump (36) through the air filter (47) and the external-side suction pipe (55). The first pump (36) compresses and discharges the sucked external air. The pressure of external air discharged by the first pump (36) is about twice the atmospheric pressure. The external air discharged from the first pump (36) flows in the first inlet pipe (52), and flows into the first inlet (42) of the first separation module (41) as untreated external air.

In the first separation module (41), untreated external air flowed into the inlet chamber (82) through the first inlet (42) flows into the hollow-fiber gas separation membranes (85). A part of air that flows in the inside of the hollow-fiber gas separation membranes (85) permeates through the gas separation membranes (85) and moves to the secondary-side outlet chamber (84) as second external air, and the remaining part of the air flows into the primary-side outlet chamber (83) as first external air. As described above, the gas separation membranes (85) have a characteristic such that the nitrogen permeability is lower than the oxygen permeability. Therefore, as illustrated in FIG. 5, the oxygen concentration of first external air is lower than the oxygen concentration of untreated external air, and the oxygen concentration of second external air is higher than the oxygen concentration of untreated external air.

First external air flowed out from the first primary-side outlet (43) of the first separation module (41) to the first primary-side pipe (53) flows into the supply pipe (120). Second external air flowed out from the first secondary-side outlet (44) of the first separation module (41) to the first secondary-side pipe (54) is discharged to the outside of the transport container (1).

Next, when the second pump (37) is activated, internal air that is present inside of the transport container (1) (to be specific, the secondary passage (29b) of the container refrigerator (10)) is sucked into the second pump (37) through the internal-side suction pipe (75). The second pump (37) compresses and discharges the sucked internal air. The pressure of external air discharged by the second pump (37) is slightly higher than the atmospheric pressure. Internal air discharged from the second pump (37) flows in the second inlet pipe (72), and flows into the second inlet (62) of the second separation module (61) as untreated internal air.

In the second separation module (61), untreated internal air flowed into the inlet chamber (82) through the second inlet (62) flows into the hollow-fiber gas separation membranes (85). A part of air that flows in the inside of the hollow-fiber gas separation membranes (85) permeates through the gas separation membranes (85) and moves to the secondary-side outlet chamber (84) as second internal air, and the remaining part of the air flows into the primary-side outlet chamber (83) as first internal air. As described above, the gas separation membranes (85) have a characteristic such that the nitrogen permeability is lower than the oxygen permeability. Therefore, as illustrated in FIG. 5, the oxygen concentration of first internal air is lower than the oxygen concentration of untreated external air, and the oxygen concentration of second external air is higher than the oxygen concentration of untreated external air.

First internal air flowed out from the second primary-side outlet (63) of the second separation module (61) to the second primary-side pipe (73) flows into the supply pipe (120). Second internal air flowed out from the second secondary-side outlet (64) of the second separation module (61) to the second secondary-side pipe (74) is discharged to the outside of the transport container (1).

As described above, first external air flowed out from the first separation module (41) and first internal air flowed out from the second separation module (61) flow into the supply pipe (120) (first external air and first internal air each have a lower oxygen concentration than air-to-be-treated before being treated). Then, mixed air of first external air and first internal air that flows in the supply pipe (120) flows into the secondary passage (29b) of the container refrigerator (10), and is supplied to the freight chamber (5) together with air that flows in the secondary passage (29b).

Usually, during the oxygen concentration reducing operation, the flow rate Qo1 of first external air supplied from the outside to the inside of the transport container (1) is higher than the flow rate Qi2 of second internal air discharged from the inside to the outside of the transport container (1) (Qo1>Qi2), and the air pressure in the transport container (1) is a positive pressure (see FIG. 5). That is, the first composition adjuster (40) supplies first external air to the inside of the transport container (1) so that the air pressure in the transport container (1) becomes a positive pressure. Because the air pressure in the transport container (1) is a positive pressure, a part of internal air is discharged to the outside of the transport container (1) through the ventilation discharge pipe (100).

Thus, in the oxygen concentration reducing operation, the oxygen concentration of internal air in the freight chamber (5) is reduced by supplying first external air, which has a lower oxygen concentration than the atmosphere, and simultaneously discharging internal air in the freight chamber (5) to the outside of the transport container (1) through the ventilation discharge pipe (100). Moreover, in the oxygen concentration reducing operation, the oxygen concentration of internal air in the freight chamber (5) is reduced by discharging second internal air, which has been separated from untreated internal air and which has a high oxygen concentration, to the outside of the transport container (1).

<Carbon Dioxide Concentration Reducing Operation>

Figure 6:
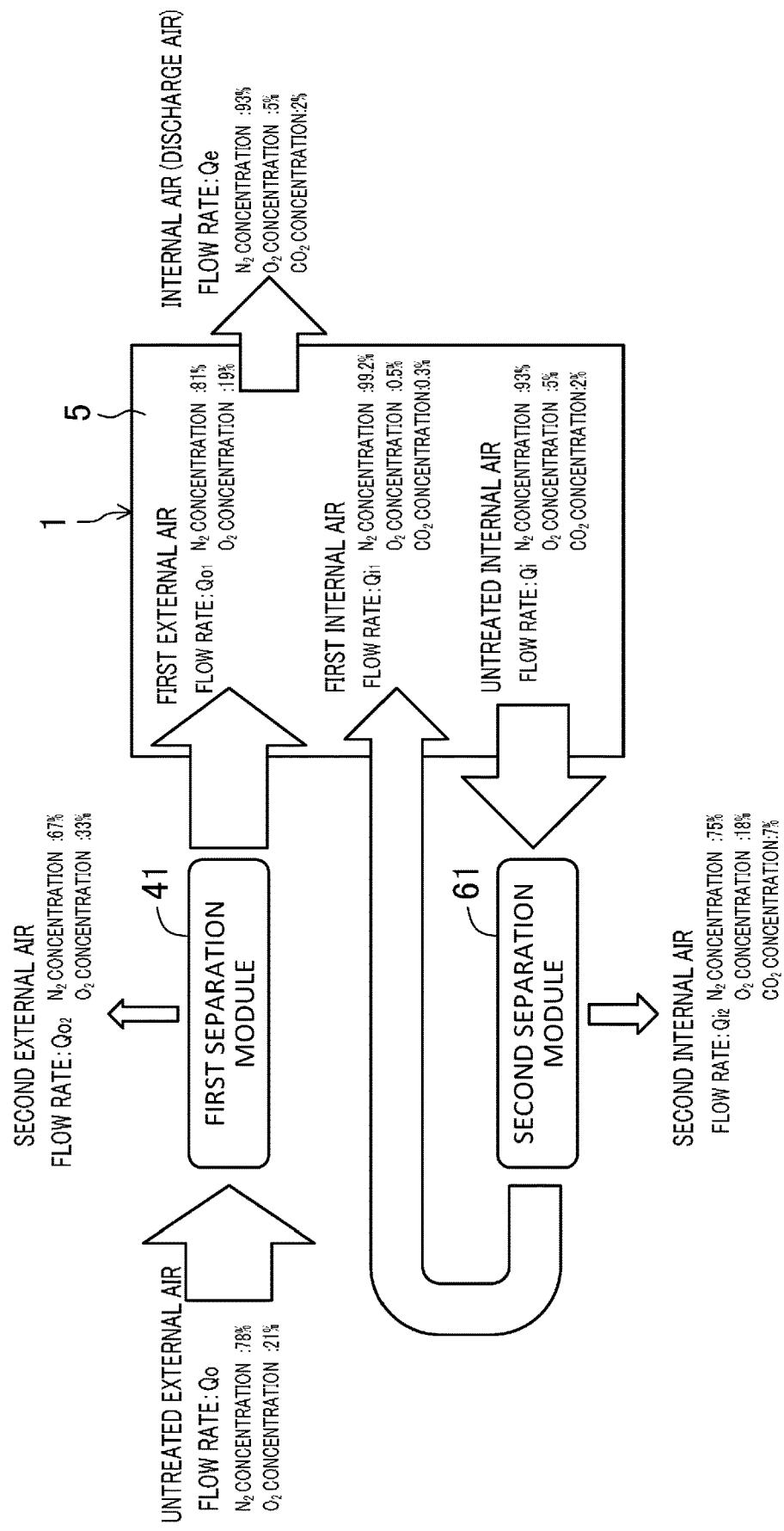
FIG. 6 is a block diagram illustrating a carbon dioxide concentration reducing operation performed by the internal air adjusting device according to the embodiment.

Referring to FIGS. 3, 4, and 6 as necessary, the carbon dioxide concentration reducing operation of the internal air adjusting device (30) will be described. In the carbon dioxide concentration reducing operation, the first composition adjuster (40) supplies first external air, which has a low oxygen concentration, to the freight chamber (5); and the second composition adjuster (60) supplies first internal air, which has a low carbon dioxide concentration, to the freight chamber (5).

In the carbon dioxide concentration reducing operation, the controller (110) sets each of the first bypass valve (50) and the second bypass valve (70) to be in a first state (the state shown by a solid line in FIG. 3), activates the first pump (36) and the second pump (37) by energizing the driving motor (38) of the pump unit (35), sets the ventilation discharge valve (101) to be in an open state, and sets the measurement on-off valve (126) to be in a closed state. The first primary-side switching valve (56), the first secondary-side switching valve (58), the second primary-side switching valve (76), and the second secondary-side switching valve (78) are all set to be in the first state. In each of the first composition adjuster (40) and the second composition adjuster (60), air flows in the same way as in the oxygen concentration reducing operation. However, in the carbon dioxide concentration reducing operation, the pressure of external air discharged by the first pump (36) and the pressure of internal air discharged by the second pump (37) are each slightly higher than the atmospheric pressure.

In the first composition adjuster (40), untreated external air flowed into the first separation module (41) is separated into: first external air, which has a higher nitrogen concentration and a lower oxygen concentration than untreated external air; and second external air, which has a lower nitrogen concentration and a higher oxygen concentration than untreated external air. Then, the first external air (supply air) is supplied to the inside of the transport container (1), and the second external air (discharge air) is discharged to the outside of the transport container (1). The carbon dioxide concentration of untreated external air is substantially the same as the carbon dioxide concentration of the atmosphere (0.04%). Therefore, the carbon dioxide concentration of the first external air can be regarded as substantially zero.

In the second composition adjuster (60), untreated internal air flowed into the second separation module (61) is separated into: first internal air, which has a higher nitrogen concentration, a lower oxygen concentration, and a lower carbon dioxide concentration than untreated internal air; and second internal air, which has a lower nitrogen concentration, a higher oxygen concentration, and a higher carbon dioxide concentration than untreated internal air. Then, the first internal air (supply air) is supplied to the inside of the transport container (1), and the second internal air (discharge air) is discharged to the outside of the transport container (1).

Usually, during the carbon dioxide concentration reducing operation, as with the oxygen concentration reducing operation, the flow rate Qo1 of first external air is higher than the flow rate Qi2 of second internal air (Qo1>Qi2), and the air pressure in the transport container (1) is a positive pressure (see FIG. 6). That is, the first composition adjuster (40) supplies first external air to the inside of the transport container (1) so that the air pressure in the transport container (1) becomes a positive pressure. Because the air pressure in the transport container (1) is a positive pressure, a part of internal air in the freight chamber (5) is discharged to the outside of the transport container (1) through the ventilation discharge pipe (100).

Thus, in the carbon dioxide concentration reducing operation, the carbon dioxide concentration of internal air in the freight chamber (5) is reduced by supplying first external air, which has an extremely low carbon dioxide concentration, and simultaneously discharging internal air to the outside of the transport container (1) through the ventilation discharge pipe (100). Moreover, in the carbon dioxide concentration reducing operation, the carbon dioxide concentration of internal air in the freight chamber (5) is reduced by discharging second internal air, which has been separated from untreated internal air and which has a high carbon dioxide concentration, to the outside of the transport container (1).

<Oxygen Concentration Increasing Operation (Oxygen Concentration Slowly-Increasing Operation)>

Referring to FIG. 3, the oxygen concentration increasing operation of the internal air adjusting device (30) will be described. In the oxygen concentration increasing operation, external air sucked by the first composition adjuster (40) from the outside of the transport container (1) is supplied as it is to the freight chamber (5), and internal air sucked by the second composition adjuster (60) from the inside of the transport container (1) is returned as it is to the freight chamber (5).

In the oxygen concentration increasing operation, the controller (110) sets each of the first bypass valve (50) and the second bypass valve (70) to be in a second state (the state shown by a broken-line in FIG. 3), activates the first pump (36) and the second pump (37) by energizing the driving motor (38) of the pump unit (35), sets the ventilation discharge valve (101) to be in an open state, and sets the measurement on-off valve (126) to be in a closed state. The first primary-side switching valve (56), the first secondary-side switching valve (58), the second primary-side switching valve (76), and the second secondary-side switching valve (78) are all set to be in the first state.

In the first composition adjuster (40), external air discharged from the first pump (36) flows into the first bypass pipe (51), flows into the first primary-side pipe (53) in a state in which the nitrogen concentration and the oxygen concentration thereof are maintained, and then is supplied to the inside of the transport container (1) through the supply pipe (120). In the second composition adjuster (60), internal air sucked into the second pump (37) is discharged from the second pump (37), flows into the second primary-side pipe (73) through the second bypass pipe (71), and then returns to the inside of the transport container (1) through the supply pipe (120). A part of internal air in the freight chamber (5) is discharged to the outside of the transport container (1) through the ventilation discharge pipe (100).

Thus, in the oxygen concentration increasing operation, the oxygen concentration in the freight chamber (5) is increased by supplying external air, which has a higher oxygen concentration than internal air, to the inside of the transport container (1).

—Control Operation of Controller—

The controller (110) of the internal air adjusting device (30) monitors the measurement values of the oxygen sensor (91) and the carbon dioxide sensor (92). On the basis of the measurement values the oxygen sensor (91) and the carbon dioxide sensor (92), the controller (110) controls the constituent equipment of the internal air adjusting device (30) so that the oxygen concentration and the carbon dioxide concentration of internal air are maintained at levels within their respective target ranges as the internal air adjusting device (30) performs the operations described above.

In the present embodiment, the controller (110) is configured to be capable of performing: an oxygen concentration recovery operation of returning the oxygen concentration in the freight chamber (5) to an oxygen concentration corresponding to that of the atmosphere; an oxygen concentration rapidly-increasing operation (oxygen concentration raising operation) of increasing the oxygen concentration at a rate higher than that of the oxygen concentration increasing operation described above; and a carbon dioxide concentration raising operation of increasing the carbon dioxide concentration in the freight chamber (5).

<Oxygen Concentration Recovery Operation>

To date, when taking out freight such as agricultural products transported or stored in the container (1), before opening the door of the container (1), ventilation is performed in order to return the oxygen concentration of internal air to a concentration corresponding to that of the atmosphere. However, it takes a long time to increase the oxygen concentration of internal air to about 21%, which corresponds to the oxygen concentration of the atmosphere, only by ventilation. Therefore, the oxygen concentration recovery operation is performed to reduce the time required to return internal air to correspond to the atmosphere.

Figure 7:
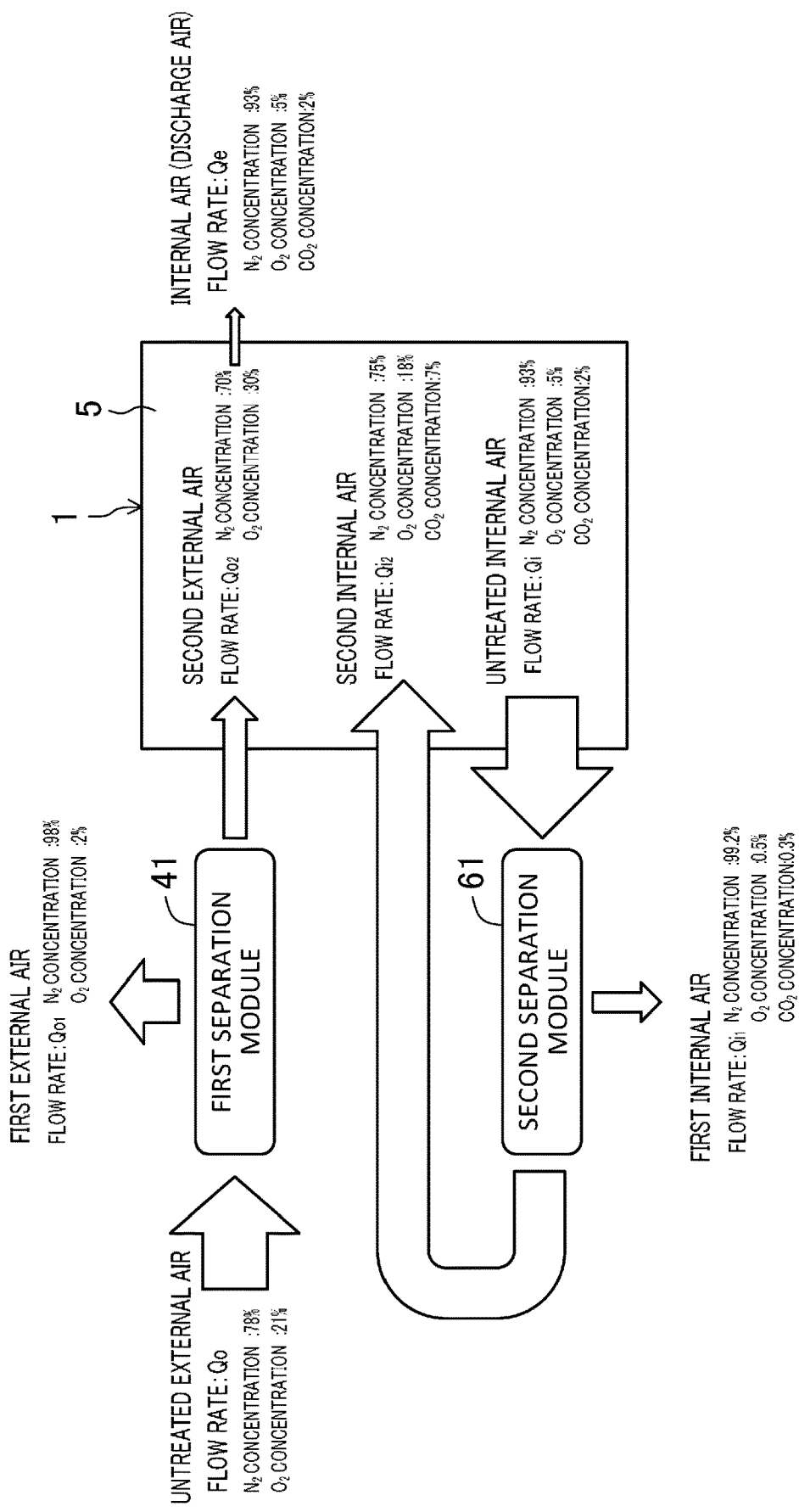
FIG. 7 is a block diagram illustrating an oxygen concentration recovery operation performed by the internal air adjusting device according to the embodiment.

Referring to FIGS. 3 and 7, the oxygen concentration recovery operation will be described.

In the oxygen concentration recovery operation, the controller (110) sets each of the first bypass valve (50) and the second bypass valve (70) to be in a first state (the state shown by a solid line in FIG. 3), activates the first pump (36) and the second pump (37) by energizing the driving motor (38) of the pump unit (35), and sets the ventilation discharge valve (101) to be in an open state. The above states are the same as those of the oxygen concentration reducing operation. The first primary-side switching valve (56), the first secondary-side switching valve (58), the second primary-side switching valve (76), and the second secondary-side switching valve (78) are all set to be in a second state.

First, when the first pump (36) is activated, external air that is present outside of the transport container (1) is sucked into the first pump (36) through the air filter (47) and the external-side suction pipe (55). The first pump (36) compresses and discharges the sucked external air. The pressure of external air discharged by the first pump (36) is about twice the atmospheric pressure. The external air discharged from the first pump (36) flows in the first inlet pipe (52), and flows into the first inlet (42) of the first separation module (41) as untreated external air.

In the first separation module (41), untreated external air flowed into the inlet chamber (82) through the first inlet (42) flows into the hollow-fiber gas separation membranes (85). A part of air that flows in the inside of the hollow-fiber gas separation membranes (85) permeates through the gas separation membranes (85) and moves to the secondary-side outlet chamber (84) as second external air (high oxygen concentration gas), which has a higher oxygen concentration than untreated external air; and the remaining part of the air flows into the primary-side outlet chamber (83) as first external air, which has a lower oxygen concentration than untreated external air.

First external air flowed out from the first primary-side outlet (43) of the first separation module (41) to the first primary-side pipe (53) flows out from the first primary-side switching valve (56) to the first secondary-side pipe (54), and is discharged to the outside of the transport container (1). Second external air flowed out from the first secondary-side outlet (44) of the first separation module (41) to the first secondary-side pipe (54) flows from the first secondary-side switching valve (58) into the supply pipe (120) through the first secondary-side supply pipe (59).

Next, when the second pump (37) is activated, internal air that is present inside of the transport container (1) (to be specific, the secondary passage (29b) of the container refrigerator (10)) is sucked into the second pump (37) through the internal-side suction pipe (75). The second pump (37) compresses and discharges the sucked internal air. The pressure of external air discharged by the second pump (37) is slightly higher than the atmospheric pressure. Internal air discharged from the second pump (37) flows in the second inlet pipe (72), and flows into the second inlet (62) of the second separation module (61) as untreated internal air.

In the second separation module (61), untreated internal air flowed into the inlet chamber (82) through the second inlet (62) flows into the hollow-fiber gas separation membranes (85). A part of air that flows in the inside of the hollow-fiber gas separation membranes (85) permeates through the gas separation membranes (85) and moves to the secondary-side outlet chamber (84) as second internal air, which has a higher oxygen concentration than untreated external air; and the remaining part of the air flows into the primary-side outlet chamber (83) as first internal air, which has a lower oxygen concentration than untreated external air.

First internal air flowed out from the second primary-side outlet (63) of the second separation module (61) to the second primary-side pipe (73) flows out from the second primary-side switching valve (76) to the second secondary-side pipe (74), and is discharged to the outside of the transport container (1). Second internal air flowed out from the second secondary-side outlet (64) of the second separation module (61) to the second secondary-side pipe (74) flows from the second secondary-side switching valve (78) into the supply pipe (120) through the second secondary-side supply pipe (79).

As described above, second external air (having a higher oxygen concentration than external air: see FIG. 7) flowed out from the first separation module (41) and second internal air (having a higher oxygen concentration than internal air: see FIG. 7) flowed out from the second separation module

(61) flow into the supply pipe (120). Then, mixed air of second external air and second internal air (mixed air having a higher oxygen concentration than the atmosphere) that flows in the supply pipe (120) flows into the secondary passage (29b) of the container refrigerator (10), and is supplied to the freight chamber (5) together with air that flows in the secondary passage (29b).

At this time, a part of internal air is discharged to the outside of the transport container (1) through the ventilation discharge pipe (100).

Thus, in the oxygen concentration recovery operation, the oxygen concentration of internal air in the freight chamber (5) is recovered to an oxygen concentration corresponding to that of the atmosphere by supplying second external air, which has a higher oxygen concentration than the atmosphere, and by simultaneously discharging internal air in the freight chamber (5) to the outside of the transport container (1) through the ventilation discharge pipe (100).

Then, the oxygen concentration in the freight chamber (5) is detected by the oxygen sensor (91), which is provided in the internal space, and the oxygen concentration recovery operation is stopped when the oxygen concentration reaches a target concentration (oxygen concentration corresponding to that of the atmosphere). Because the Industrial Safety and Health Act of Japan states that the reference value of oxygen deficiency is 18% or lower, the target concentration need not be 21%, and may be 18% or higher.

It is preferable that the door of the container (1) be configured to be locked, for example, until the oxygen concentration recovery operation is stopped. By configuring the door to be locked when a start switch is turned on to start the oxygen concentration recovery operation, it is possible to suppress an operation error such that the door is mistakenly opened during the oxygen concentration recovery operation.

<Oxygen Concentration Rapidly-Increasing Operation (Oxygen Concentration Raising Operation)>

Figure 9:
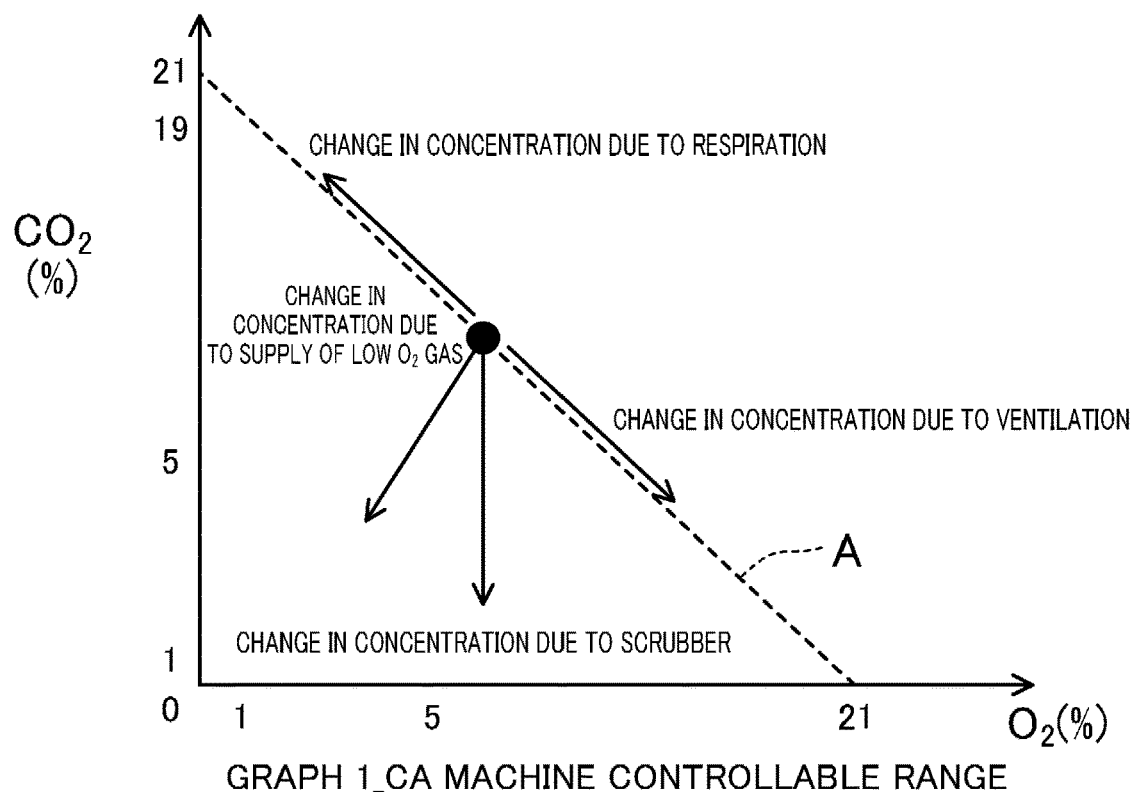
FIG. 9 is a graph illustrating the change in the oxygen concentration and the carbon dioxide concentration of internal air.

The oxygen concentration raising operation is an operation that is performed to rapidly increase the oxygen concentration to a level higher than 21%, when oxygen concentration needs to be increased. This contrasts with the oxygen concentration increasing operation described above (slowly-increasing operation), with which it is not possible to increase the oxygen concentration to such a level that the sum of the oxygen concentration and the carbon dioxide concentration exceeds the line of 21% (to a level exceeding the oxygen concentration in the atmosphere), because the ratio of oxygen removal to carbon dioxide generation due to respiration of plants is 1:1 as shown by a line A in FIG. 9. As can be seen from FIG. 9, with existing technology, the oxygen concentration can be increased only up to 21%, even when carbon dioxide is selectively removed from air by performing ventilation and by dissolving carbon dioxide in a liquid by using a scrubber.

In the oxygen concentration raising operation, basically, valves are set in the same way as in the oxygen concentration recovery operation, and flow of a high oxygen concentration gas is similar to that of the oxygen concentration recovery operation. However, it is preferable that the second pump (37) be stopped and the discharge pressure of the first pump (36) be set so that a gas having a higher oxygen concentration can be obtained in the separator (41).

Flow of air in the oxygen concentration raising operation will be described.

When the first pump (36) is activated, external air that is present outside of the transport container (1) is sucked into the first pump (36) through the air filter (47) and the external-side suction pipe (55). The external air discharged from the first pump (36) flows in the first inlet pipe (52), flows into the first inlet (42) of the first separation module (41), which is an oxygen separator, as untreated external air.

In the first separation module (41), a part of untreated external air flowed into the inlet chamber (82) through the first inlet (42) permeates through the gas separation membranes (85) and moves to the secondary-side outlet chamber (84) as second external air (high oxygen concentration gas), which has a higher oxygen concentration than untreated external air; and the remaining part of the air flows into the primary-side outlet chamber (83) as first external air, which has a lower oxygen concentration than untreated external air.

First external air flowed out from the first primary-side outlet (43) of the first separation module (41) to the first primary-side pipe (53) flows out from the first primary-side switching valve (56) to the first secondary-side pipe (54), and is discharged to the outside of the transport container (1). Second external air flowed out from the first secondary-side outlet (44) of the first separation module (41) to the first secondary-side pipe (54) flows from the first secondary-side switching valve (58) into the supply pipe (120) through the first secondary-side supply pipe (59). Then, the high oxygen concentration gas flows into the secondary passage (29b) of the container refrigerator (10), and is supplied to the freight chamber (5) together with air that flows in the secondary passage (29b).

Figure 10:
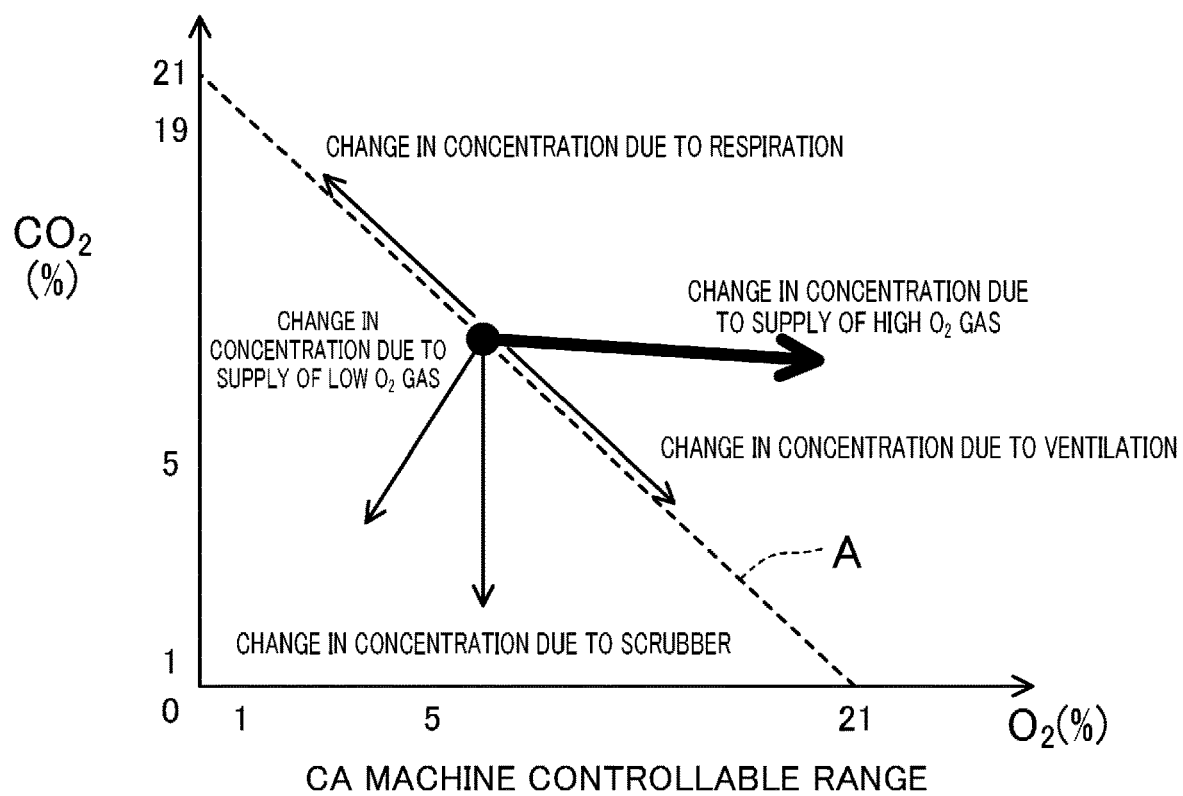
FIG. 10 is a graph illustrating the change in the oxygen concentration and the carbon dioxide concentration of internal air due to an oxygen concentration raising operation according to the embodiment.

Thus, in the oxygen concentration raising operation, the second external air, which has a higher oxygen concentration than the atmosphere, is supplied. Accordingly, as illustrated in FIG. 10, the oxygen concentration can be rapidly increased to a concentration exceeding the line A. Thus, it is possible to create an environment that is suitable for plants (such as asparagus) for which it is preferable to make the internal space to be under a high oxygen concentration condition during transportation.

<Carbon Dioxide Concentration Raising Operation>

The carbon dioxide raising operation is an operation for maintaining the carbon dioxide concentration of the internal space of the container at a high concentration, which is performed for the following reasons; if a pump is used to supply a high oxygen concentration gas to the internal space when the oxygen concentration of the internal space becomes too low, carbon dioxide in the internal space is discharged to the external space, and it becomes difficult to maintain the carbon dioxide concentration of the internal space at a high concentration; and with a configuration that does not use a pump to supply a gas to the internal space, external air easily flows into a negative-pressure part of the internal space, and it becomes difficult to maintain the carbon dioxide concentration of the internal space at a high concentration because the carbon dioxide concentration of external air is low.

In the carbon dioxide concentration raising operation, basically, valves are set in the same way as in the oxygen concentration recovery operation, and flow of a high carbon dioxide concentration gas is similar to that of the high oxygen concentration gas. However, it is preferable that the discharge pressure of the pump unit (35) be set so that a gas having a higher carbon dioxide concentration can be obtained in the separator (41, 61).

Flow of air in the carbon dioxide concentration raising operation will be described.

When the first pump (36) is activated, external air that is present outside of the transport container (1) is sucked into the first pump (36) through the air filter (47) and the external-side suction pipe (55). The external air discharged from the first pump (36) flows in the first inlet pipe (52), flows into the first inlet (42) of the first separation module (41), which is a carbon dioxide separator, as untreated external air.

In the first separation module (41), a part of untreated external air flowed into the inlet chamber (82) through the first inlet (42) permeates through the gas separation membranes (85) and moves to the secondary-side outlet chamber (84) as second external air (high carbon dioxide concentration gas), which has a higher carbon dioxide concentration than untreated external air; and the remaining part of the air flows into the primary-side outlet chamber (83) as first external air, which has a lower carbon dioxide concentration than untreated external air.

First external air flowed out from the first primary-side outlet (43) of the first separation module (41) to the first primary-side pipe (53) flows out from the first primary-side switching valve (56) to the first secondary-side pipe (54), and is discharged to the outside of the transport container (1). Second external air flowed out from the first secondary-side outlet (44) of the first separation module (41) to the first secondary-side pipe (54) flows from the first secondary-side switching valve (58) into the supply pipe (120) through the first secondary-side supply pipe (59).

When the second pump (37) is activated, internal air that is present inside of the transport container (1) is sucked into the second pump (37) through the internal-side suction pipe (75). The second pump (37) compresses and discharges the sucked internal air. Internal air discharged from the second pump (37) flows in the second inlet pipe (72), and flows into the second inlet (62) of the second separation module (61), which is a carbon dioxide separator, as untreated internal air.

In the second separation module (61), a part of untreated internal air flowed into the inlet chamber (82) through the second inlet (62) permeates through the gas separation membranes (85) and moves to the secondary-side outlet chamber (84) as second internal air, which has a higher carbon dioxide concentration than untreated external air; and the remaining part of the air flows into the primary-side outlet chamber (83) as first internal air, which has a lower carbon dioxide concentration than untreated external air.

First internal air flowed out from the second primary-side outlet (63) of the second separation module (61) to the second primary-side pipe (73) flows out from the second primary-side switching valve (76) to the second secondary-side pipe (74), and is discharged to the outside of the transport container (1). Second internal air (high carbon dioxide concentration gas) flowed out from the second secondary-side outlet (64) of the second separation module (61) to the second secondary-side pipe (74) flows from the second secondary-side switching valve (78) into the supply pipe (120) through the second secondary-side supply pipe (79).

As described above, the high carbon dioxide concentration gas flowed out from the first separation module (41) and the high carbon dioxide concentration gas flowed out from the second separation module (61) flow into the supply pipe (120). Then, the mixed high carbon dioxide concentration gas flows into the secondary passage (29b) of the container refrigerator (10), and is supplied to the freight chamber (5) together with air that flows in the secondary passage (29b).

Figure 11:
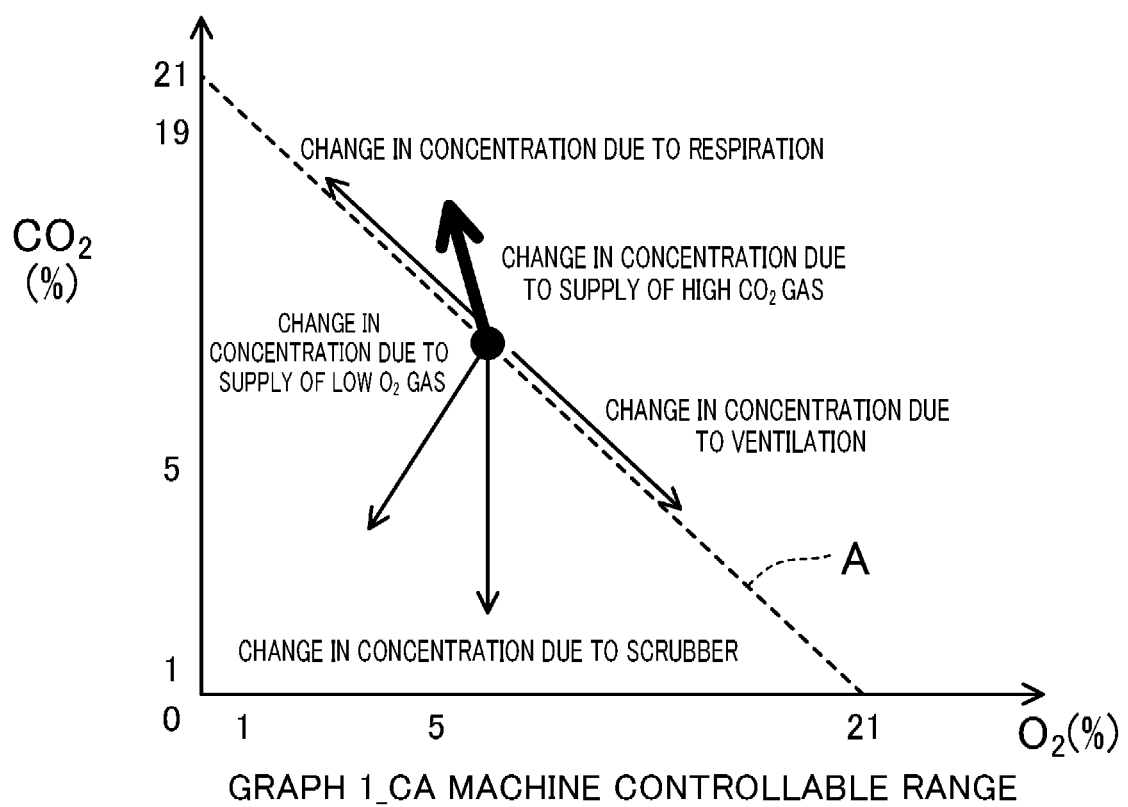
FIG. 11 is a graph illustrating the change in the oxygen concentration and the carbon dioxide concentration of internal air due to a carbon dioxide concentration raising operation according to the embodiment.

Thus, in the carbon dioxide concentration raising operation, the second external air, which has a higher carbon dioxide concentration than air before being treated, is supplied to the internal space. Accordingly, as illustrated in FIG. 11, the carbon dioxide concentration can be rapidly increased to a concentration exceeding the line A. Therefore, it is possible to create an environment that is suitable for plants (such as blackberry and strawberry) for which it is preferable to make the internal space to be under a high carbon dioxide concentration condition during transportation.

The carbon dioxide concentration raising operation may be performed by using only the second pump (37) while stopping the first pump (36).

Advantageous Effects of Embodiment

The internal air adjusting device (air composition adjusting device) (30) according to the present embodiment includes: the oxygen separator (41) that separates oxygen from external air to be supplied to the target space (5); the gas supply path (135) including the high concentration gas supply path (136) for oxygen through which the oxygen separator (41) communicates with the target space (5); and the controller (110) that performs an oxygen concentration raising operation of supplying a high oxygen concentration gas, which has a higher oxygen concentration than external air before being treated by the oxygen separator (41), to the target space (5) through the high concentration gas supply path (136). Moreover, the oxygen separator (41) includes the gas separation membrane (85).

Accordingly, with the present embodiment, the high oxygen concentration gas is generated when air before being treated passes through the gas separation membrane (85) of the oxygen separator (41), and the high oxygen concentration gas is supplied to the target space (5) through the high concentration gas supply path (136). Accordingly, the oxygen concentration of air in the target space (5), whose composition is adjusted by the air composition adjusting device, can be made higher than the oxygen concentration in the atmosphere, and, in particular, the oxygen concentration can be rapidly increased to a concentration exceeding the line A as illustrated in FIG. 10. Thus, it is possible to create an environment that is suitable for plants (such as asparagus) for which it is preferable to make the internal space to be under a high oxygen concentration condition during transportation.

In the present embodiment, the oxygen separator (41) is configured to separate the external air into the high oxygen concentration gas and a low oxygen concentration gas, which has a lower oxygen concentration than external air before being treated; the gas supply path (135) includes the low concentration gas supply path (137) for oxygen that supplies the low oxygen concentration gas to the target space (5), and the switcher (56, 58) that selectively supplies one of the high oxygen concentration gas and the low oxygen concentration gas to the target space (5); and the controller (110) is configured to supply the high oxygen concentration gas or the low oxygen concentration gas to the target space (5) by switching the switcher (56, 58).

Accordingly, with the present embodiment, the high oxygen concentration gas or the low oxygen concentration gas can be selectively supplied to the target space (5) by switching the switcher (56, 58), and thus the operation of increasing the oxygen concentration and the operation of reducing the oxygen concentration of the freight chamber (5), which is a target space, can be switched.

In the present embodiment, the carbon dioxide separator (41, 61) that separates carbon dioxide from air-to-be-treated to be supplied to the target space (5), and the high concentration gas supply path (136) for carbon dioxide through which the carbon dioxide separator (41, 61) communicates with the target space (5) are provided; and the controller (110) is configured to be capable performing, in addition to the oxygen concentration raising operation, a carbon dioxide concentration raising operation of supplying a high carbon dioxide concentration gas, which has a higher carbon dioxide concentration than air-to-be-treated before being treated by the carbon dioxide separator (41, 61), to the target space (5) through the high concentration gas supply path (136) for carbon dioxide. Moreover, the carbon dioxide separator (41, 61) includes the gas separation membrane (85).

Accordingly, with the present embodiment, the high carbon dioxide concentration gas is generated when air before being treated passes through the gas separation membrane (85) of the carbon dioxide separator (41, 61), and the high carbon dioxide concentration gas is supplied to the target space (5) through the high concentration gas supply path (136) for carbon dioxide. Therefore, the carbon dioxide concentration of air in the target space (5), whose composition is adjusted by the air composition adjusting device, can be made higher than the carbon dioxide concentration of air before being treated. Thus, as illustrated in FIG. 11, the carbon dioxide concentration can be rapidly increased to a concentration exceeding the line A, and thus it is possible to create an environment that is suitable for plants (such as blackberry and strawberry) for which it is preferable to make the internal space to be under a high carbon dioxide concentration condition during transportation.

In the present embodiment, the carbon dioxide separator (41, 61) is configured to separate the air-to-be-treated into the high carbon dioxide concentration gas and a low carbon dioxide concentration gas, which has a lower carbon dioxide concentration than air-to-be-treated before being treated; the gas supply path (135) includes the low concentration gas supply path (137) for carbon dioxide that supplies the low carbon dioxide concentration gas to the target space (5), and the switcher (76, 78) that selectively supplies one of the high carbon dioxide concentration gas and the low carbon dioxide concentration gas to the target space (5); and the controller (110) is configured to be capable of supplying the high carbon dioxide concentration gas or the low carbon dioxide concentration gas to the target space (5) by switching the switcher (76, 78).

Accordingly, with the present embodiment, the high carbon dioxide concentration gas or the low carbon dioxide concentration gas can be selectively supplied to the target space (5) by switching the switcher (76, 78), and thus the operation of increasing the carbon dioxide concentration and the operation of reducing the carbon dioxide concentration of the freight chamber (5), which is a target space, can be switched.

Moreover, with the present embodiment, for example, when the oxygen concentration recovery operation is performed before opening the door of the container (1), mixed air (high oxygen concentration gas) of second external air and second internal air, which has a higher oxygen concentration than the atmosphere, is supplied to the internal space, in which the oxygen concentration is low. Accordingly, the rate of increase of the oxygen concentration in the internal space of the container (1) becomes higher than that of a case where only ventilation is performed to introduce the atmosphere into the internal space. Moreover, in the case where ventilation is simply performed to introduce the atmosphere, which has an oxygen concentration of about 21%, to the internal space, it takes a long time, which is about the same time as that for replacing substantially the entire air in the internal space with the atmosphere, to return the oxygen concentration in the internal space to an oxygen concentration corresponding to that of the atmosphere. In contrast, with the present embodiment, by introducing a high oxygen concentration gas, which has a higher oxygen concentration than the atmosphere, into the internal space, it is possible to reduce the time for returning the oxygen concentration in the internal space to an oxygen concentration corresponding to that of the atmosphere as compared with the existing technology.

Moreover, with the present embodiment, a high oxygen concentration gas is supplied to the internal space of the transport container (1) during the oxygen concentration recovery operation by using: the first composition adjuster (40) that generates a low oxygen concentration gas and a high oxygen concentration gas by separating nitrogen and oxygen from the external air of the transport container (1); and the second composition adjuster (60) that generates a low oxygen concentration gas and a high oxygen concentration gas by separating nitrogen, oxygen, and carbon dioxide from the internal air of the transport container (1). Therefore, a configuration that can reduce the time for returning the oxygen concentration of the internal space to an oxygen concentration corresponding to that of the atmosphere can be easily realized by using the gas separation membrane (85) of each of the gas composition adjusters (40, 60), and the recovery of the oxygen concentration can be efficiently performed.

Second Embodiment

An internal air adjusting device (30) according to a second embodiment will be described. The internal air adjusting device according to the present embodiment (30) differs from the internal air adjusting device (30) according to the first embodiment in the first composition adjuster (40) and the controller (110), and is the same as the first embodiment in the configuration of the second composition adjuster (60). In the internal air adjusting device (30), in addition to a first directional control valve (232) and a second directional control valve (233) of the first composition adjuster (40) described below, a third directional control valve (291) and a fourth directional control valve (292) are provided. Here, regarding the internal air adjusting device (30) according to the second embodiment, differences from the internal air adjusting device (30) according to the first embodiment will be described.

—Configuration of First Composition Adjuster—

The first composition adjuster (40) according to the present embodiment is configured to separate external air, which is sucked from the outside of the transport container (1) (untreated external air), into first external air and second external air, as with the first composition adjuster (40) according to the first embodiment. The first composition adjuster (40) according to the present embodiment is configured to separate untreated external air into first external air and second external air by using a so-called pressure swing adsorption (PSA) method, and differs from the first composition adjuster (40) according to the first embodiment in this respect.

Figure 12:
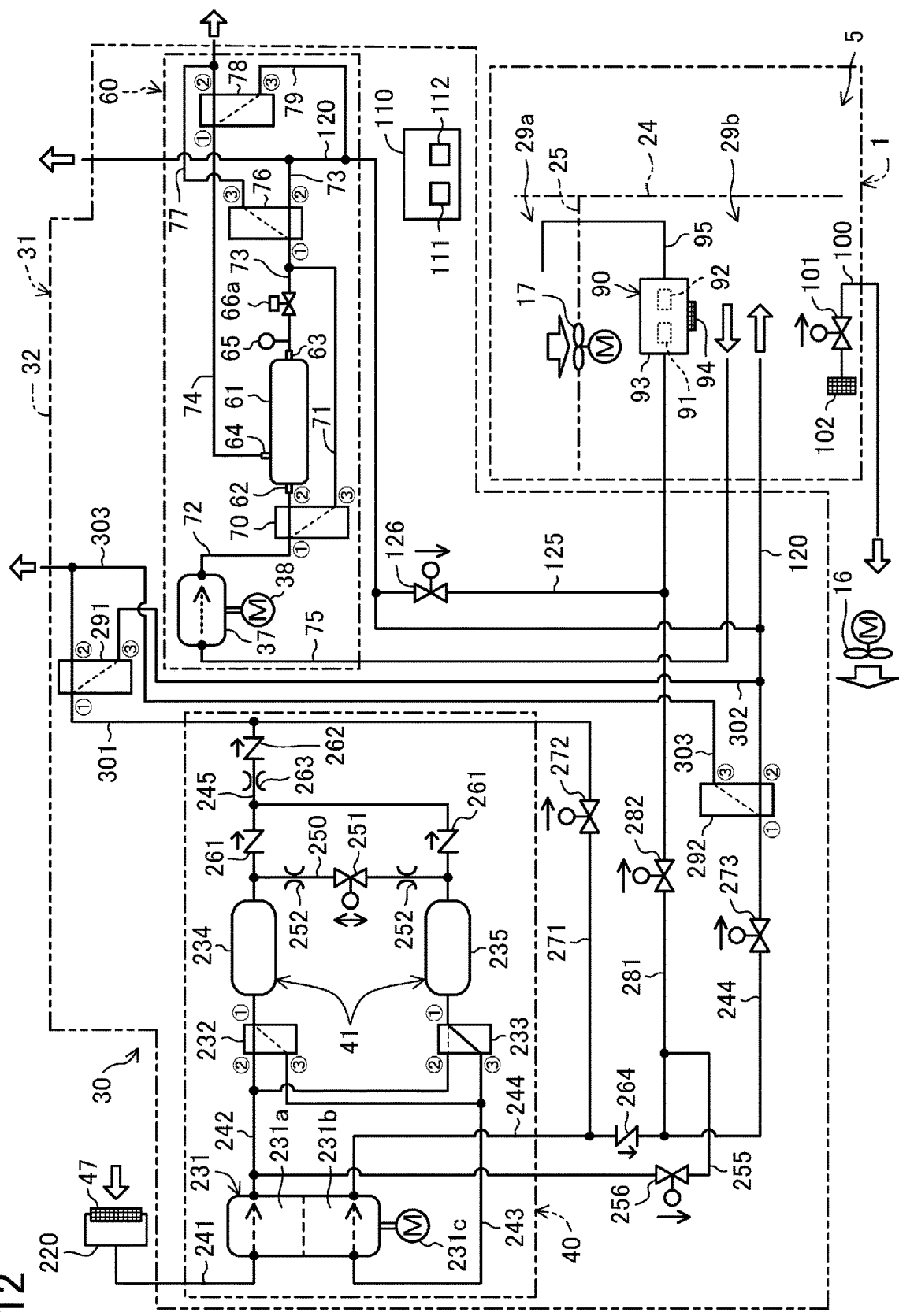
FIG. 12 is a pipe system diagram illustrating the configuration of an internal air adjusting device according to a second embodiment.

As illustrated in FIG. 12, the first composition adjuster (40) according to the present embodiment includes an air pump (231), instead of the first pump (36) of the pump unit (35). That is, in the internal air adjusting device (30) according to the present embodiment, the pump unit (35) includes the second pump (37) and the driving motor (38) but does not include the first pump (36). The first composition adjuster (40) according to the present embodiment includes the first directional control valve (232), the second directional control valve (233), a first adsorption tube (234), and a second adsorption tube (235). As described below, an adsorbent that adsorbs nitrogen in air is provided in each of the adsorption tubes (234, 235).

<Air Pump>

The air pump (231) is disposed in the internal space of the unit case (32). The air pump (231) includes a first pump mechanism (231a) and a second pump mechanism (231b) each of which sucks, compresses, and discharges air. The first pump mechanism (231a) and the second pump mechanism (231b) are oil-less pumps that do not use lubricating oil. The first pump mechanism (231a), which is a compressing unit, and the second pump mechanism (231b), which is a decompressing unit, are both connected to the drive shaft of a driving motor (231c). The first pump mechanism (231a) and the second pump mechanism (231b) are each rotationally driven by the driving motor (231c) to suck air from a suction opening, compresses the air, and discharges the compressed air from a discharge opening.

<External Air Pipe, Discharge Pipe, Filter Unit>

One end of an external air pipe (241), which forms an external air passage, is connected to the suction opening of the first pump mechanism (231a). The external air pipe (241) is provided so as to extend through the unit case (32). The other end of the external air pipe (241), which is positioned outside of the unit case (32), is connected to a filter unit (220).

The filter unit (220) includes an air filter (47). The air filter (47) is a filter for trapping dust, salt, and the like included in external air. In the present embodiment, a membrane filter having breathability and waterproofness is used as the air filter (47). The filter unit (220) is a box-shaped member and introduces air (external air) that has passed through the air filter (47) into the external air pipe (241). Although not illustrated, the filter unit (220) is disposed on the downstream side of the condenser (13) in the external machine chamber (28).

One end of a discharge pipe (242), which forms a discharge passage, is connected to the discharge opening of the first pump mechanism (231a). The discharge pipe (242) branches into two branch pipes at the other end thereof. One of the branch pipes is connected to the first directional control valve (232), and the other branch pipe is connected to the second directional control valve (233).

<Suction Pipe, Supply Pipe>

One end of a suction pipe (243), which forms a suction passage, is connected to the suction opening of the second pump mechanism (231b). The suction pipe (243) branches into two branch pipes at the other end thereof. One of the branch pipes is connected to the first directional control valve (232), and the other branch pipe is connected to the second directional control valve (233).

One end of a supply connection pipe (244), which forms a supply passage, is connected to the discharge opening of the second pump mechanism (231b). The other end of the supply connection pipe (244) is connected to the supply pipe (120).

In the supply connection pipe (244), a check valve (264) and a supply-side on-off valve (273) are provided, in order from one end to the other end thereof. The check valve (264) allows flow of air only in a direction from the one end to the other end of the supply connection pipe (244), and prevents flow of air in the opposite direction. The supply-side on-off valve (273) is an electromagnetic on-off valve.

<First and Second Directional Control Valves>

The first directional control valve (232) and the second directional control valve (233) are each a switching valve having three ports. The directional control valves (232, 233) are each configured to be switched between: a first state, in which the first port communicates with the second port and is shut off from the third port; and a second state, in which the first port communicates with the third port and is shut off from the second port.

The first port of the first directional control valve (232) is connected to one end of the first adsorption tube (234). A branch pipe of the discharge pipe (242) is connected to the second port of the first directional control valve (232), and a branch pipe of the suction pipe (243) is connected to the third port of the first directional control valve (232). The first directional control valve (232) switches the first adsorption tube (234) between a state in which the first adsorption tube (234) communicates with the first pump mechanism (231a) and a state in which the first adsorption tube (234) communicates with the second pump mechanism (231b).

The first port of the second directional control valve (233) is connected to one end of the second adsorption tube (235). A branch pipe of the discharge pipe (242) is connected to the second port of the second directional control valve (233), and a branch pipe of the suction pipe (243) is connected to the third port of the second directional control valve (233). The second directional control valve (233) switches the second adsorption tube (235) between a state in which the second adsorption tube (235) communicates with the first pump mechanism (231a) and a state in which the second adsorption tube (235) communicates with the second pump mechanism (231b).

<Adsorption Tube>

The first adsorption tube (234) and the second adsorption tube (235) are each a member that includes a cylindrical vessel, both ends of which are closed, and an adsorbent, with which the vessel is filled.

The adsorbent, with which the adsorption tubes (234, 235) are filled, has a property that the adsorbent adsorbs a nitrogen component in a compressed state in which the pressure is higher than the atmospheric pressure, and releases the nitrogen component in a decompressed state in which the pressure is lower than the atmospheric pressure. In the present embodiment, as the adsorbent, for example, zeolite, which is a porous material that has pores each having a diameter smaller than the molecular diameter of a nitrogen molecule (3.0 angstrom) and larger than the molecular diameter of an oxygen molecule (2.8 angstrom), is used.

In the first composition adjuster (40) according to the present embodiment, the first adsorption tube (234) and the second adsorption tube (235) constitute a first separator (41). The two adsorption tubes (234, 235), which constitute the first separator (41), separates untreated external air into: first external air, which has a higher nitrogen concentration and a lower oxygen concentration than untreated external air; and second external air, which has a lower nitrogen concentration and a higher oxygen concentration than untreated external air.

<Oxygen Discharge Pipe>

An oxygen discharge pipe (245), which forms an oxygen discharge passage, branches into two branch pipes at one end thereof. One of the branch pipes is connected to the other end of the first adsorption tube (234), and the other branch pipe is connected to the second adsorption tube (235). A check valve (261) is provided in each branch pipe of the oxygen discharge pipe (245). Each check valve (261) allows flow of air in a direction such that the air flows out from a corresponding one of the adsorption tubes (234, 235) and blocks flow of air in the opposite direction.

A check valve (262) and an orifice (263) are provided in a joined portion of the oxygen discharge pipe (245). The check valve (262) is disposed closer to the other end of the oxygen discharge pipe (245) than the orifice (263). The check valve (262) allows flow of air in a direction toward the other end of the oxygen discharge pipe (245) and blocks flow of air in the opposite direction.

<Purge Pipe>

A purge pipe (250), which forms a purge passage, is connected to each branch pipe of the oxygen discharge pipe (245). One end of the purge pipe (250) is connected to a branch pipe connected to the first adsorption tube (234), and the other end of the purge pipe (250) is connected to a branch pipe connected to the second adsorption tube (235). The one end of the purge pipe (250) is connected to a position between the first adsorption tube (234) and the check valve (261). The other end of the purge pipe (250) is connected to a position between the second adsorption tube (235) and the check valve (261).

A purge valve (251) is provided in the purge pipe (250). The purge valve (251) is an electromagnetic on-off valve. The purge valve (251) is opened when equalizing the pressures in the first adsorption tube (234) and the second adsorption tube (235). An orifice (252) is provided on each of two sides of the purge pipe (250) of the purge valve (251).

<Discharge Connection Pipe>

A discharge connection pipe (271), which forms a ventilation connection passage, is connected to the supply connection pipe (244). One end of the discharge connection pipe (271) is connected to the supply connection pipe (244), and the other end of the discharge connection pipe (271) is connected to the oxygen discharge pipe (245). The one end of the discharge connection pipe (271) is connected to a part of the supply connection pipe (244) between the second pump mechanism (231b) and the check valve (264). The other end of the discharge connection pipe (271) is connected to a part of the oxygen discharge pipe (245) further outward than the check valve (262).

A discharge on-off valve (272) is provided in the discharge connection pipe (271). The discharge on-off valve (272) is an electromagnetic on-off valve. The discharge on-off valve (272) is opened when discharging air that flows in the supply connection pipe (244) to the external space.

<Measurement Connection Pipe>

A measurement connection pipe (281), which forms a measurement passage, is connected to the supply connection pipe (244). The measurement connection pipe (281) is a pipe for connecting the first composition adjuster (40) to the sensor unit (90).

One end of the measurement connection pipe (281) is connected to the supply connection pipe (244), and the other end of the measurement connection pipe (281) is connected to the measurement pipe (125). The one end of the measurement connection pipe (281) is connected to a part of the supply connection pipe (244) between the check valve (264) and the supply-side on-off valve (273). The other end of the measurement connection pipe (281) is connected to a part of the measurement pipe (125) between the measurement on-off valve (126) and the sensor unit (90).

A measurement on-off valve (282) is provided in the measurement connection pipe (281). The measurement on-off valve (282) is an electromagnetic on-off valve. The measurement on-off valve (282) is opened when feeding air that flows in the supply connection pipe (244) to the sensor unit (90).

<Bypass Pipe>

A bypass connection pipe (255), which forms a bypass passage, is connected to the discharge pipe (242). One end of the bypass connection pipe (255) is connected to the discharge pipe (242), and the other end of the bypass connection pipe (255) is connected to the measurement connection pipe (281). The one end of the bypass connection pipe (255) is connected to a part of the discharge pipe (242) closer to the first pump mechanism (231a) than the branching portion of the discharge pipe (242). The other end of the bypass connection pipe (255) is connected to a part of the measurement connection pipe (281) between one end of the measurement connection pipe (281) and the measurement on-off valve (282). The bypass connection pipe (255) forms a first bypass passage for supplying external air to the internal space of the transport container (1) in such a way that the external air bypasses the first adsorption tube (234) and the second adsorption tube (235).

A bypass on-off valve (256) is provided in the bypass connection pipe (255). The bypass on-off valve (256) is an electromagnetic on-off valve. The bypass on-off valve (256) constitutes a first bypass valve mechanism for changing the flow rate of external air that flows into the bypass connection pipe (255). The bypass on-off valve (256) is opened when supplying external air discharged by the first pump mechanism (231a) to the freight chamber (5) without changing the composition thereof <Third and Fourth Directional Control Valves>

The third directional control valve (291) and the fourth directional control valve (292) are each a switching valve having three ports. Each of the directional control valves (291, 292) is configured to be switched between: a first state, in which the first port communicates with the second port and is shut off from the third port; and a second state, in which the first port communicates with the third port and is shut off from the second port.

One end of a first discharge pipe (301) is connected to the other end of the oxygen discharge pipe (245) and the other end of the discharge connection pipe (271), which are joined. The third directional control valve (291) is connected to a middle part of the first discharge pipe (301). To be specific, the first discharge pipe (301) is connected the first port and the second port of the third directional control valve (291). The first discharge pipe (301) is provided to extend through the unit case (32). The other end of the first discharge pipe (301) opens in the external space of the transport container (1).

The fourth directional control valve (292) is provided in a part of the supply connection pipe (244) between the supply-side on-off valve (273) and the supply pipe (120). To be specific, the supply connection pipe (244) is connected to the first port and the second port of the fourth directional control valve (292). One end of a supply branch connection pipe (302) is connected to a part of the supply connection pipe (244) between the second port of the fourth directional control valve (292) and the supply pipe (120). The other end of the supply branch connection pipe (302) is connected to the third port of the third directional control valve (291). One end of a second discharge pipe (303) is connected the third port of the fourth directional control valve (292). The other end of the second discharge pipe (303) is connected to the first discharge pipe (301) at a position inside of the unit case (32) of the main unit (31).

—Driving Operation of First Composition Adjuster—

A driving operation of the first composition adjuster (40) according to the present embodiment will be described.

The first composition adjuster (40) according to the present embodiment separates untreated external air into first external air and second external air by alternately and repeatedly performing a first operation and a second operation described below each for a predetermined time (for example, 14.5 seconds). As with the first composition adjuster (40) according to the first embodiment, the first composition adjuster (40) according to the present embodiment performs an operation of separating untreated external air into first external air and second external air in each of the oxygen concentration reducing operation and the carbon dioxide concentration reducing operation of the internal air adjusting device (30).

<First Operation>

Figure 13:
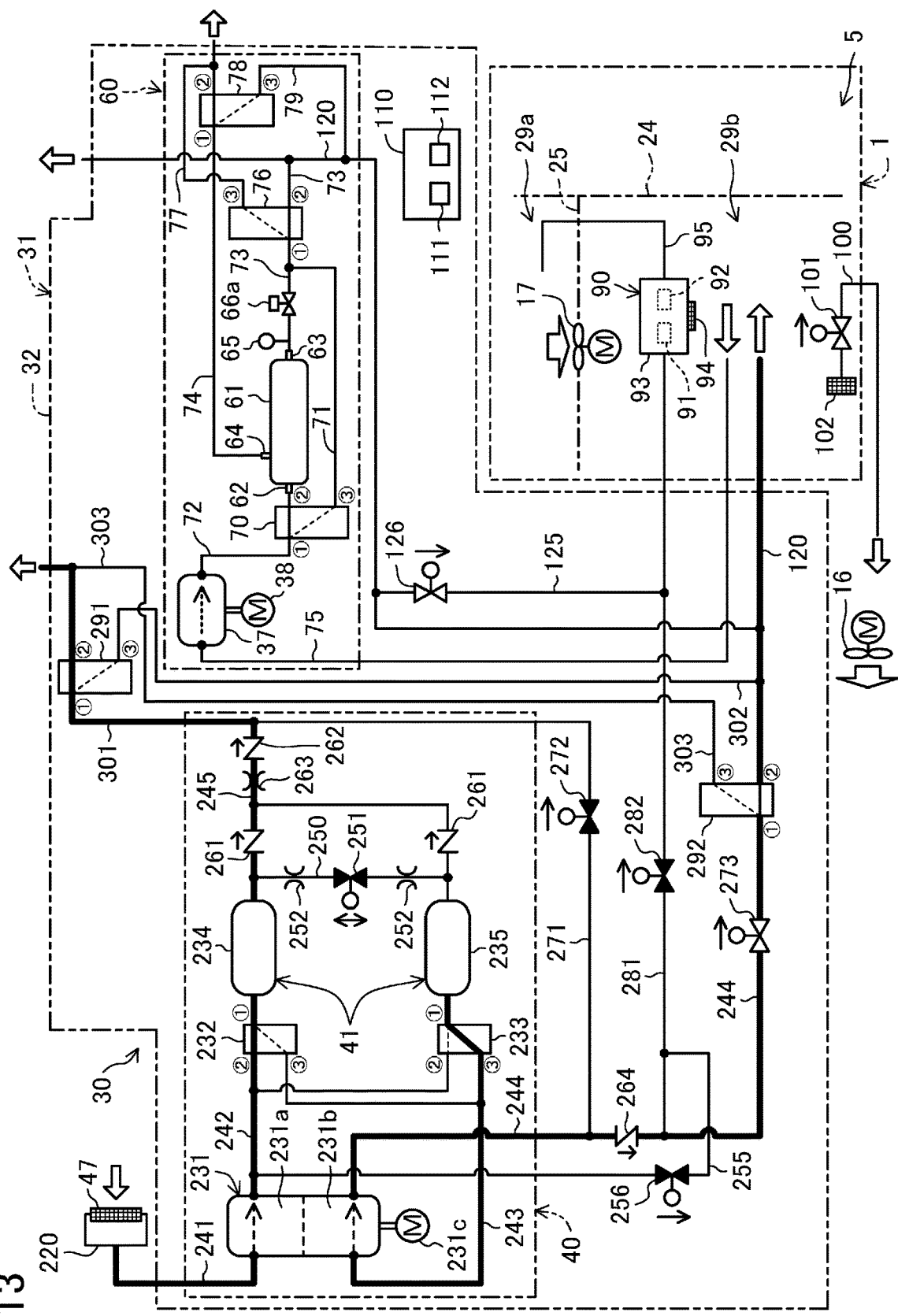
FIG. 13 is a pipe system diagram of the internal air adjusting device according to the second embodiment, illustrating a state in which a first composition adjusting unit is performing a first operation.

As illustrated in FIG. 13, in the first operation, the first directional control valve (232) is set to be in a first state, and the second directional control valve (233) is set to be in a second state. As a result, the discharge opening of the first pump mechanism (231*a*) is connected to the first adsorption tube (234), and the second adsorption tube (235) is connected to the suction opening of the second pump mechanism (231*b*). In the first operation, the supply-side on-off valve (273) is opened, and the remaining on-off valves (251, 256, 272, 282) are closed. Then, in the first operation, an adsorption operation targeted at the first adsorption tube (234) and a desorption operation targeted at the second adsorption tube (235) are performed.

The first pump mechanism (231*a*) sucks untreated external air from the external air pipe (241), compresses the untreated external air, and supplies the compressed untreated external air to the first adsorption tube (234). In the first adsorption tube (234), nitrogen included in the supplied untreated external air is adsorbed to an adsorbent. As a result, in the first adsorption tube (234), second external air, which has a lower nitrogen concentration and a higher oxygen concentration than untreated external air, is generated. Second external air flows out from the first adsorption tube (234), flows in the oxygen discharge pipe (245), and is discharged through the third directional control valve (291) to the external space as discharged air.

The second pump mechanism (231*b*) sucks air from the second adsorption tube (235). In the second adsorption tube (235), the pressure of the inside thereof decreases, and nitrogen is desorbed from the adsorbent. As a result, in the second adsorption tube (235), first external air, which has a higher nitrogen concentration and a lower oxygen concentration than untreated external air, is generated. First external air flows from the first adsorption tube (234) into the suction pipe (243) and is sucked into the second pump mechanism (231*b*). The second pump mechanism (231*b*) compresses the sucked first external air, and discharges the sucked first external air to the supply connection pipe (244). First external air flows in the supply connection pipe (244) as supply air, joins air that flows through the supply pipe (120), and then is supplied to the internal space.

<Second Operation>

Figure 14:
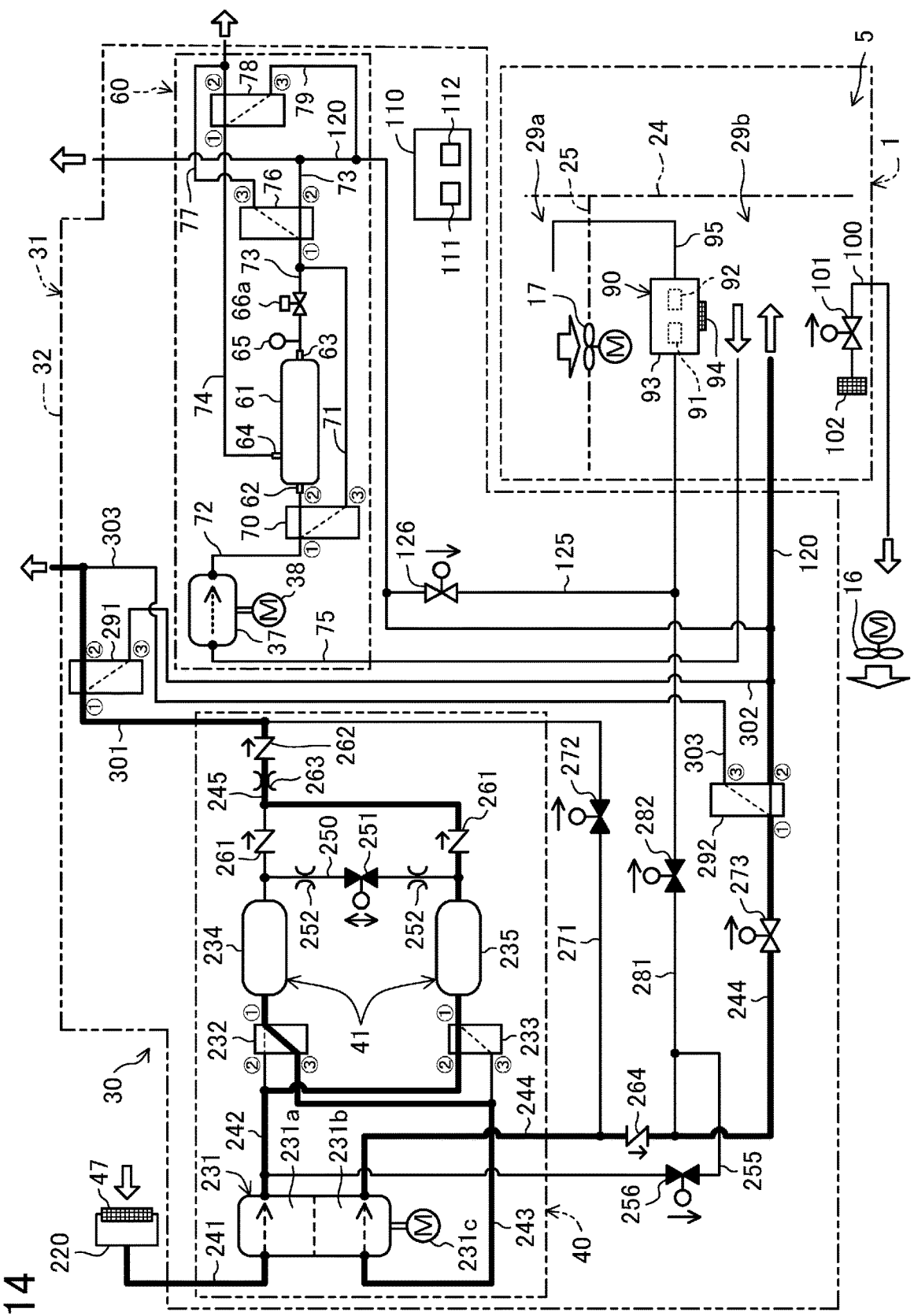
FIG. 14 is a pipe system diagram of the internal air adjusting device according to the second embodiment, illustrating a state in which the first composition adjusting unit is performing a second operation.

As illustrated in FIG. 14, in the second operation, the first directional control valve (232) is set to be in a second state, and the second directional control valve (233) is set to be in a first state. As a result, the discharge opening of the first pump mechanism (231*a*) is connected to the second adsorption tube (235), and the first adsorption tube (234) is connected to the suction opening of the second pump mechanism (231*b*). In the second operation, the supply-side on-off valve (273) is opened, and the remaining on-off valves (251, 256, 272, 282) are closed. Then, in the second operation, a desorption operation targeted at the first adsorption tube (234) and an adsorption operation targeted at the second adsorption tube (235) are performed.

The first pump mechanism (231*a*) sucks untreated external air from the external air pipe (241), compresses the untreated external air, and supplies the compressed untreated external air to the second adsorption tube (235). In the second adsorption tube (235), nitrogen included in the supplied untreated external air is adsorbed to an adsorbent. As a result, in the second adsorption tube (235), second external air, which has a lower nitrogen concentration and a higher oxygen concentration than untreated external air, is generated. Second external air flows out from the second adsorption tube (235), flows in the oxygen discharge pipe (245), and is discharged through the third directional control valve (291) to the external space as discharged air.

The second pump mechanism (231*b*) sucks air from the first adsorption tube (234). In the first adsorption tube (234), the pressure of the inside thereof decreases, and nitrogen is desorbed from the adsorbent. As a result, in the first adsorption tube (234), first external air, which has a higher nitrogen concentration and a lower oxygen concentration than untreated external air, is generated. First external air flows from the first adsorption tube (234) into the suction pipe (243) and is sucked into the second pump mechanism (231*b*). The second pump mechanism (231*b*) compresses the sucked first external air, and discharges the sucked first external air to the supply connection pipe (244). First external air flows in the supply connection pipe (244) as supply air, joins air that flows through the supply pipe (120), and then is supplied to the internal space.

<Oxygen Concentration Raising Operation>

In the second embodiment, the oxygen concentration raising operation is performed by the second composition adjuster (60). At this time, second internal air (air having a higher oxygen concentration than internal air) flowed out from the second separation module (61) flows into the supply pipe (120) from the second secondary-side pipe and the second secondary-side supply pipe (79). Second external air that flows in the supply pipe (120) flows into the secondary passage (29*b*) of the container refrigerator (10), and is supplied to the freight chamber (5) together with air that flows in the secondary passage (29*b*). A part of internal air is discharged to the outside of the transport container (1) through the ventilation discharge pipe (100).

Thus, in the oxygen concentration recovery operation, the oxygen concentration of internal air in the freight chamber (5) is increased by supplying second internal air, which has a high oxygen concentration, to the freight chamber (5), and simultaneously discharging internal air in the freight chamber (5) to the outside of the transport container (1) through the ventilation discharge pipe (100).

<Carbon Dioxide Concentration Raising Operation>

The carbon dioxide concentration raising operation is performed by the second composition adjuster (60). In the carbon dioxide concentration raising operation, with a valve setting that is the same as that of the oxygen concentration raising operation, the discharge pressure of the second pump (37) is set so that a gas having a higher carbon dioxide concentration can be obtained in the second separation module (61).

In the carbon dioxide concentration raising operation, internal air is sucked into the second pump (37) through the internal-side suction pipe (75) and discharged, and flows into the second separation module (61). First internal air, which has a lower carbon dioxide concentration than untreated external air, flows out from the second separation module (61) to the second primary-side pipe (73), flows out to the second secondary-side pipe (74) through a broken-line passage of the second primary-side switching valve (76), and is discharged to the outside of the transport container (1).

Second internal air (high carbon dioxide concentration gas) flowed out to the second secondary-side pipe (74) from the second separation module (61) flows through a broken-line passage of the second secondary-side switching valve (78), and flows into the supply pipe (120) through the second secondary-side supply pipe (79). Thus, in the carbon dioxide concentration raising operation, a high carbon dioxide concentration gas flowed out from the second separation module (61) is supplied from the supply pipe (120) through the secondary passage (29b) of the container refrigerator (10) to the freight chamber (5), and increases the carbon dioxide concentration of internal air in the freight chamber (5). In particular, the carbon dioxide concentration in a small transport container (1) rapidly increases.

With the second embodiment, it is possible to suppress discharge of carbon dioxide due to forced ventilation when the gas is supplied to the internal space, and therefore it is possible to suppress decrease of the carbon dioxide concentration of the internal space.

Moreover, with the present embodiment, it is possible to realize a configuration that performs reduction of the oxygen concentration of the internal space by using an adsorbent and that uses a gas separation membrane in a carbon dioxide discharging unit.

Other Embodiments

The internal air adjusting device (30) in each of the embodiments described above may be modified as follows.

—First Modification—

In the oxygen concentration recovery operation according to the first embodiment described above as an example, the oxygen concentration recovery operation (first oxygen concentration recovery operation) illustrated in FIG. 7 is performed by setting all of the first primary-side switching valve (56), the first secondary-side switching valve (58), the second primary-side switching valve (76), and the second secondary-side switching valve (78) to be in the second state in the oxygen concentration reducing operation. However, it is possible to perform an oxygen concentration recovery operation (second oxygen concentration recovery operation) illustrated in FIG. 8 by setting all of the first primary-side switching valve (56), the first secondary-side switching valve (58), the second primary-side switching valve (76), and the second secondary-side switching valve (78) to be in the second state in the carbon dioxide concentration reducing operation.

Figure 8:
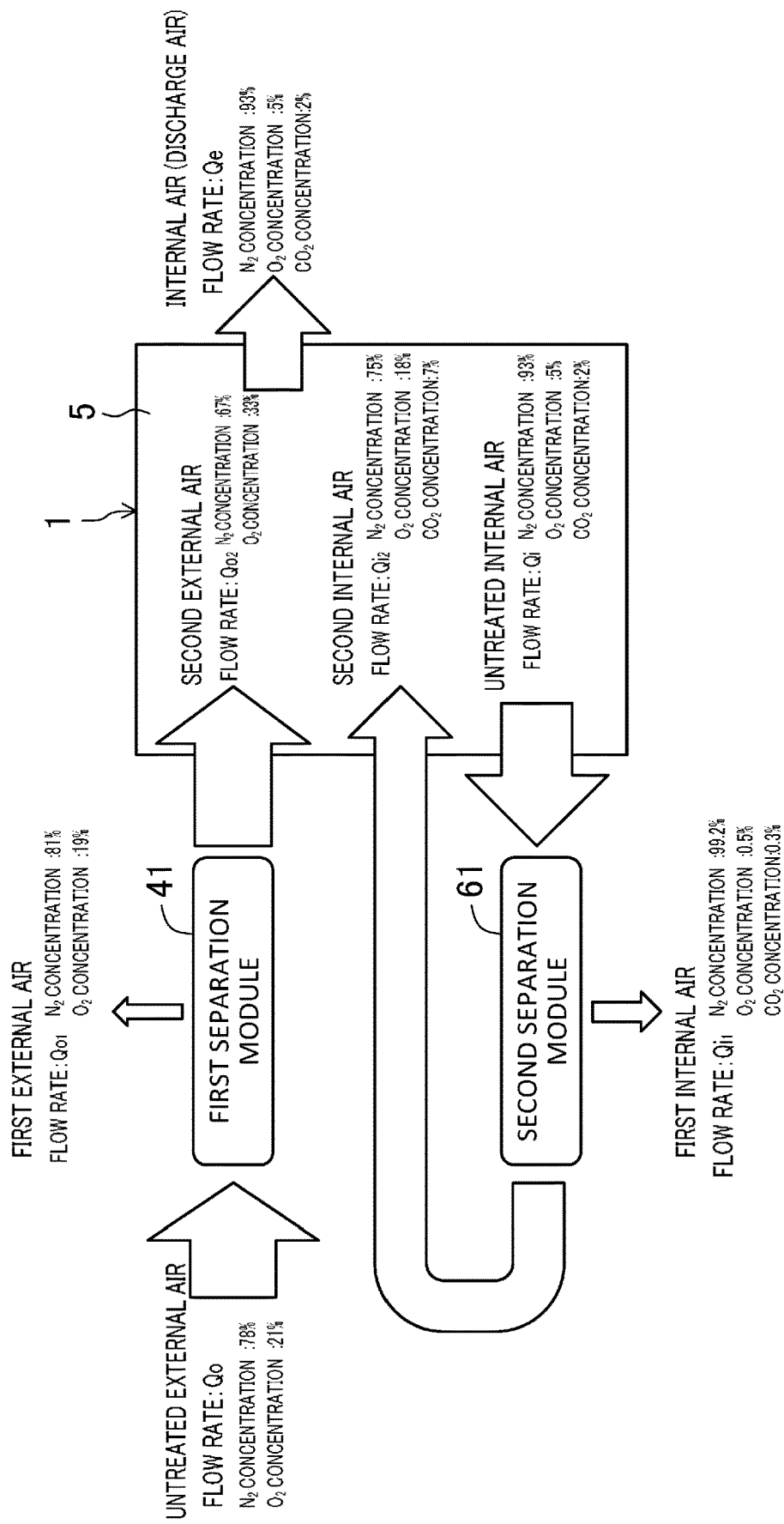
FIG. 8 is a block diagram illustrating another example of an oxygen concentration recovery operation performed by the internal air adjusting device according to the embodiment.

In the first embodiment, in each of the first oxygen concentration recovery operation shown in FIG. 7 and the second oxygen concentration recovery operation shown in FIG. 8, the second pump (37) is operated to return second internal air, which has a higher oxygen concentration than internal air, to the inside of the container (1). However, because the second internal air has a higher oxygen concentration than that of internal air but has a lower oxygen concentration than the atmosphere in this example, it is possible to perform the oxygen recovery operation by operating the second pump (37) halfway through the operation (for example, until the oxygen concentration of the internal space becomes 18%) and thereafter operating only the first pump, or it is possible to perform the oxygen concentration recovery operation by using only the first pump (36) while stopping the second pump (37) from the beginning. However, because the Industrial Safety and Health Act states that the standard value of oxygen deficiency is 18% or lower, there is no problem in using both of second external air and second internal air that satisfy this standard from the start to the end of the oxygen concentration recovery operation. By doing so, the oxygen concentration recovery time can be reduced compared with a case where the second pump (37) is stopped halfway through the operation.

In each of the first oxygen concentration recovery operation and the second oxygen concentration recovery operation according to the first embodiment, the oxygen concentration of internal space may be made close to an oxygen concentration corresponding to that of the atmosphere by supplying at least second external air, among second external air and second internal air, to the inside of the container (1) and simultaneously performing ventilation. By thus performing ventilation simultaneously with the oxygen concentration recovery operation to mix the atmosphere into a part of air supplied to the internal space, it is possible to save energy compared with a case where a gas generated by the gas composition adjuster (40, 60) is used as all of the gas to be supplied to the internal space.

The oxygen concentration of a high oxygen concentration gas used in the oxygen concentration recovery operation in the first embodiment and the first modification is an example. By adjusting the opening degrees of the first control valve (46) and the second control valve (66), the pressures of external air and internal air that pass through the gas separation membrane (85) can be adjusted, and separation performance can be adjusted. Therefore, for example, a high oxygen concentration gas having a higher oxygen concentration may be generated and supplied to the internal space, so that the operation time of the oxygen concentration recovery operation can be further reduced.

—Second Modification—

In the internal air adjusting device (30) according to the first embodiment, the gas separation membranes (85) of the first separation module (41) and the gas separation membranes (85) of the second separation module (61) may have characteristics that differ from each other.

—Third Modification—

In the internal air adjusting device (30) according to the first embodiment, the first bypass valve (50) may be configured to be capable changing, in a stepwise manner or in a continuous manner, the ratio of the flow rate of untreated external air that flows into the first separation module (41) to the flow rate of untreated external air that flows into the first bypass pipe (51). The second bypass valve (70) may be configured to be capable changing, in a stepwise manner or in a continuous manner, the ratio of the flow rate of untreated internal air that flows into the second separation module (61) to the flow rate of untreated external air that flows into the second bypass pipe (71).

—Fourth Modification—

In the internal air adjusting device (30) according to the first embodiment, a driving motor may be coupled to each of the first pump (36) and the second pump (37). With the present modification, it is possible to activate one of the first pump (36) and the second pump (37) and to stop the other.

—Fifth Modification—

In the internal air adjusting device (30) according to the first embodiment, each of the first composition adjuster (40) and the second composition adjuster (60) may be configured to separate sucked air into two types of air, whose compositions differ from each other, by using a so-called pressure swing adsorption (PSA) method. The second embodiment is an example in which a configuration of the PSA method is used for the second composition adjuster (60). With a configuration in which the PSA method is used for each of the first composition adjuster (40) and the second composition adjuster (60), each of the composition adjusters (40, 60) alternately and repeatedly perform: a step of generating air that has a low nitrogen concentration, a high oxygen concentration, and a high carbon dioxide concentration by causing nitrogen included in sucked air to be adsorbed to an adsorbent; and a step generating air that has a high nitrogen concentration, a low oxygen concentration, a low carbon dioxide concentration by causing nitrogen to be desorbed from the adsorbent.

—Sixth Modification—

The internal air adjusting device (30) according to any of the embodiments described above may be provided in a stationary refrigerator or a stationary freezer. The internal air adjusting device (30) according to any of the embodiments described above may be provided in a refrigerator/freezer container for land transportation, which is transported by a truck or a railway. The internal air adjusting device (30) according to any of the embodiments described above may be provided in a refrigerator/freezer truck in which a box body that forms a freight chamber is integrated with a chassis. In each of the embodiments described above, an internal air adjusting device has been described. However, the application of the present disclosure is not limited to an air composition adjusting device for an internal space of a container or the like, as long as the device is capable of adjusting the composition of air in a target space.

The embodiments and modifications described above may be modified in design and detail in various ways without departing from the spirit and scope of the claims. The embodiments and modifications described above may be combined or replaced as appropriate as long as they do not impair the function of the object of the present disclosure.

INDUSTRIAL APPLICABILITY

As described above, the present disclosure is useful for an internal air adjusting device.

REFERENCE SIGNS LIST 5 freight chamber (target space)
30 air composition adjusting device
41 first separation module (oxygen separator, carbon dioxide separator)
56 first primary-side switching valve (switcher)
58 first secondary-side switching valve (switcher)
61 first separation module (carbon dioxide separator)
76 second primary-side switching valve (switcher)
78 second secondary-side switching valve (switcher)
85 gas separation membrane
110 controller
136 high concentration gas supply path
137 low concentration gas supply path

The invention claimed is:

1. An air composition adjusting device for adjusting composition of air in a target space, comprising:
an oxygen separator that separates oxygen from external air to be supplied to the target space;
a gas supply path including a high concentration gas supply path for oxygen through which the oxygen separator communicates with the target space;
a pump that compresses and discharges sucked air; and
a controller that performs an oxygen concentration increasing operation and an oxygen concentration raising operation, wherein
the oxygen concentration increasing operation is an operation of supplying external air compressed by the pump to the target space in such a way that the external air bypasses the oxygen separator,
the oxygen concentration raising operation is an operation of, with the oxygen separator, generating, from external air compressed by the pump, a high oxygen concentration gas which has a higher oxygen concentration than external air before being treated by the oxygen separator; and then supplying the high oxygen concentration gas to the target space through the high concentration gas supply path for oxygen, and
the oxygen concentration raising operation is an operation performed at a higher rate of increase in an oxygen concentration than the oxygen concentration increasing operation.

2. The air composition adjusting device according to claim 1,
wherein the oxygen separator is configured to separate the external air into the high oxygen concentration gas and a low oxygen concentration gas, which has a lower oxygen concentration than external air before being treated,
wherein the gas supply path includes a low concentration gas supply path for oxygen that supplies the low oxygen concentration gas to the target space, and a switcher that selectively supplies one of the high oxygen concentration gas and the low oxygen concentration gas to the target space, and
wherein the controller is configured to supply the high oxygen concentration gas or the low oxygen concentration gas to the target space by switching the switcher.

3. The air composition adjusting device according to claim 1,
wherein the oxygen separator includes a separation membrane that separates oxygen from the external air.

4. The air composition adjusting device according to claim 1, further comprising:
a carbon dioxide separator that separates carbon dioxide from air-to-be-treated to be supplied to the target space; and a high concentration gas supply path for carbon dioxide through which the carbon dioxide separator communicates with the target space,
wherein the controller is configured to be capable performing, in addition to the oxygen concentration raising operation, a carbon dioxide concentration raising operation of supplying a high carbon dioxide concentration gas, which has a higher carbon dioxide concentration than air-to-be-treated before being treated by the carbon dioxide separator, to the target space through the high concentration gas supply path for carbon dioxide.

5. The air composition adjusting device according to claim 4,
wherein the carbon dioxide separator is configured to separate the air-to-be-treated into the high carbon dioxide concentration gas and a low carbon dioxide concentration gas, which has a lower carbon dioxide concentration than air-to-be-treated before being treated,
wherein the gas supply path includes a low concentration gas supply path for carbon dioxide that supplies the low carbon dioxide concentration gas to the target space, and a switcher that selectively supplies one of the high carbon dioxide concentration gas and the low carbon dioxide concentration gas to the target space, and wherein the controller is configured to be capable of supplying the high carbon dioxide concentration gas or the low carbon dioxide concentration gas to the target space by switching the switcher.

6. The air composition adjusting device according to claim 3, further comprising:
an adsorber that is provided with an adsorbent, that separates nitrogen, oxygen, and carbon dioxide from internal air of the target space, and that is capable of generating a low oxygen concentration gas and a high oxygen concentration gas, the low oxygen concentration gas having a higher nitrogen concentration, a lower oxygen concentration, and a lower carbon dioxide concentration than the internal air, and the high oxygen concentration gas having a lower nitrogen concentration, a higher oxygen concentration, and a higher carbon dioxide concentration than the internal air.

7. The air composition adjusting device according to claim 2,
wherein the oxygen separator includes a separation membrane that separates oxygen from the external air.

8. The air composition adjusting device according to claim 2, further comprising:
a carbon dioxide separator that separates carbon dioxide from air-to-be-treated to be supplied to the target space; and a high concentration gas supply path for carbon dioxide through which the carbon dioxide separator communicates with the target space,
wherein the controller is configured to be capable performing, in addition to the oxygen concentration raising operation, a carbon dioxide concentration raising operation of supplying a high carbon dioxide concentration gas, which has a higher carbon dioxide concentration than air-to-be-treated before being treated by the carbon dioxide separator, to the target space through the high concentration gas supply path for carbon dioxide.

9. The air composition adjusting device according to claim 3, further comprising:
a carbon dioxide separator that separates carbon dioxide from air-to-be-treated to be supplied to the target space; and a high concentration gas supply path for carbon dioxide through which the carbon dioxide separator communicates with the target space,
wherein the controller is configured to be capable performing, in addition to the oxygen concentration raising operation, a carbon dioxide concentration raising operation of supplying a high carbon dioxide concentration gas, which has a higher carbon dioxide concentration than air-to-be-treated before being treated by the carbon dioxide separator, to the target space through the high concentration gas supply path for carbon dioxide.

10. The air composition adjusting device according to claim 7, further comprising:
a carbon dioxide separator that separates carbon dioxide from air-to-be-treated to be supplied to the target space; and a high concentration gas supply path for carbon dioxide through which the carbon dioxide separator communicates with the target space,
wherein the controller is configured to be capable performing, in addition to the oxygen concentration raising operation, a carbon dioxide concentration raising operation of supplying a high carbon dioxide concentration gas, which has a higher carbon dioxide concentration than air-to-be-treated before being treated by the carbon dioxide separator, to the target space through the high concentration gas supply path for carbon dioxide.

11. The air composition adjusting device according to claim 8,
wherein the carbon dioxide separator is configured to separate the air-to-be-treated into the high carbon dioxide concentration gas and a low carbon dioxide concentration gas, which has a lower carbon dioxide concentration than air-to-be-treated before being treated,
wherein the gas supply path includes a low concentration gas supply path for carbon dioxide that supplies the low carbon dioxide concentration gas to the target space, and a switcher that selectively supplies one of the high carbon dioxide concentration gas and the low carbon dioxide concentration gas to the target space, and
wherein the controller is configured to be capable of supplying the high carbon dioxide concentration gas or the low carbon dioxide concentration gas to the target space by switching the switcher.

12. The air composition adjusting device according to claim 9,
wherein the carbon dioxide separator is configured to separate the air-to-be-treated into the high carbon dioxide concentration gas and a low carbon dioxide concentration gas, which has a lower carbon dioxide concentration than air-to-be-treated before being treated,
wherein the gas supply path includes a low concentration gas supply path for carbon dioxide that supplies the low carbon dioxide concentration gas to the target space, and a switcher that selectively supplies one of the high carbon dioxide concentration gas and the low carbon dioxide concentration gas to the target space, and
wherein the controller is configured to be capable of supplying the high carbon dioxide concentration gas or the low carbon dioxide concentration gas to the target space by switching the switcher.

13. The air composition adjusting device according to claim 10,
wherein the carbon dioxide separator is configured to separate the air-to-be-treated into the high carbon dioxide concentration gas and a low carbon dioxide concentration gas, which has a lower carbon dioxide concentration than air-to-be-treated before being treated,
wherein the gas supply path includes a low concentration gas supply path for carbon dioxide that supplies the low carbon dioxide concentration gas to the target space, and a switcher that selectively supplies one of the high carbon dioxide concentration gas and the low carbon dioxide concentration gas to the target space, and
wherein the controller is configured to be capable of supplying the high carbon dioxide concentration gas or the low carbon dioxide concentration gas to the target space by switching the switcher.

14. The air composition adjusting device according to claim 7, further comprising:
an adsorber that is provided with an adsorbent, that separates nitrogen, oxygen, and carbon dioxide from internal air of the target space, and that is capable of generating a low oxygen concentration gas and a high oxygen concentration gas, the low oxygen concentration gas having a higher nitrogen concentration, a lower oxygen concentration, and a lower carbon dioxide concentration than the internal air, and the high oxygen concentration gas having a lower nitrogen concentration, a higher oxygen concentration, and a higher carbon dioxide concentration than the internal air.

* * * * *